(12) United States Patent
Xiong

(10) Patent No.: US 12,418,826 B2
(45) Date of Patent: Sep. 16, 2025

(54) APPLICATION PROGRAM CONTROL METHOD AND APPARATUS

(71) Applicant: Tencent Technology (Shenzhen) Company Limited, Guangdong (CN)

(72) Inventor: Chunshan Xiong, Guangdong (CN)

(73) Assignee: Tencent Technology (Shenzhen) Company Limited (CN)

( * ) Notice: Subject to any disclaimer, the term of this patent is extended or adjusted under 35 U.S.C. 154(b) by 325 days.

(21) Appl. No.: 17/985,278

(22) Filed: Nov. 11, 2022

(65) Prior Publication Data

US 2023/0070295 A1 Mar. 9, 2023

Related U.S. Application Data

(63) Continuation of application No. PCT/CN2022/070546, filed on Jan. 6, 2022.

(30) Foreign Application Priority Data

Feb. 25, 2021 (CN) .......................... 202110215376.4

(51) Int. Cl.
*H04W 28/02* (2009.01)
(52) U.S. Cl.
CPC ... *H04W 28/0268* (2013.01); *H04W 28/0257* (2013.01); *H04W 28/0273* (2013.01)
(58) Field of Classification Search
CPC ......... H04W 28/0257; H04W 28/0273; H04W 28/0268
See application file for complete search history.

(56) References Cited

U.S. PATENT DOCUMENTS

| 2019/0253917 | A1* | 8/2019 | Dao ...................... H04W 76/27 |
| 2019/0261211 | A1 | 8/2019 | Wu et al. |
| 2020/0112907 | A1* | 4/2020 | Dao .................. H04M 15/8016 |
| 2020/0280871 | A1 | 9/2020 | Khirallah et al. |
| 2020/0280889 | A1 | 9/2020 | Liu |

(Continued)

FOREIGN PATENT DOCUMENTS

| CN | 102769873 | 11/2012 |
| CN | 110120878 | 8/2019 |

(Continued)

OTHER PUBLICATIONS

External European Search Report issued Apr. 4, 2024 in European Application No. 22758683.1.

(Continued)

*Primary Examiner* — Mehmood B. Khan
(74) *Attorney, Agent, or Firm* — Crowell & Moring LLP

(57) ABSTRACT

This discloses relates to an application program control method and apparatus. The method includes that: an application entity receives a notification message transmitted by a core entity (320), the notification message indicating that a change in a parameter value of a quality of service notification control (QNC) of a non-guaranteed bit rate (GBR) bearer flow satisfies a reporting condition; and the application entity controls an application program according to the notification message (340). According to this application, the application entity may perceive a change in a wireless network state of the non-GBR bearer flow, and further actively control running of the application program according to the change.

19 Claims, 13 Drawing Sheets

(56) References Cited

U.S. PATENT DOCUMENTS

| | | | |
|---|---|---|---|
| 2022/0038946 A1* | 2/2022 | Kim | H04W 28/0284 |
| 2022/0232450 A1* | 7/2022 | Shariat | H04W 4/80 |
| 2023/0284078 A1* | 9/2023 | Pateromichelakis | H04W 28/0268 370/235 |

FOREIGN PATENT DOCUMENTS

| | | |
|---|---|---|
| CN | 110995773 | 4/2020 |
| WO | 2020/074108 | 4/2020 |
| WO | WO 2020/073159 A1 | 4/2020 |
| WO | 2020/226435 A1 | 11/2020 |

OTHER PUBLICATIONS

Ericsson; "QoS—Continuation of stage 3 1-15 work", 3GPP Draft; R3-173207, 3rd Generation Partnership Project (3GPP), Mobile Competence Centre; 650; Route Des Lucioles; F-06921; Aug. 21, 2017; 11 pages.

Ericsson, "QoS—Continuation of stage 3 work," 3GPP TSG-RAN WG3 Meeting #97, Berlin, Germany, Aug. 2017, 19 pages.

Huawei et al. "Support for QoS Notification Control in EPC," 3GPP TSG-WG SA2 Meeting #135, Split, Croatia, Oct. 2019, 31 pages.

Office action in Japanese application No. 2023-525508, dated Feb. 27, 2024, 9 pages (with English translation).

International Search Report issued Mar. 16, 2022 in International (PCT) Application No. PCT/CN2022/070546.

Huawei et al., "S2-175610 "TS23.501: Clarification for the Default QoS Flow, Notification Control and 5QI"" SA WG2 Meeting #122Bis S2-175610, Aug. 15, 2017.

Office action in Japanese application No. 2023-525508, dated Jul. 9, 2027, 7 pages (with English translation).

Office Action issued in Korean Patent Application No. 10-2023-7011660 dated Jun. 25, 2025, w/English translation, 11 pages.

* cited by examiner

APPLICATION PROGRAM CONTROL METHOD AND APPARATUS

RELATED APPLICATION

This application is a continuation application of PCT Patent Application No. PCT/CN2022/070546, filed on Jan. 6, 2022, which claims priority to Chinese Patent Application No. 202110215376.4, entitled "APPLICATION PROGRAM CONTROL METHOD AND APPARATUS, DEVICE, AND STORAGE MEDIUM", and filed on Feb. 25, 2021, wherein the content of each of the above-referenced applications is incorporated herein by reference in its entirety.

FIELD OF THE TECHNOLOGY

This disclosure relates to the field of mobile communications, and particularly to an application program control method and apparatus, a device, and a medium.

BACKGROUND OF THE DISCLOSURE

In a 5th-generation (5G) mobile communication technology, QoS control is performed in units of QoS flow.

According to bearer types, QoS flows are divided into two types: guaranteed bit rate (GBR) and non-guaranteed bit rate (non-GBR). For a GBR QoS flow, a corresponding bit rate may still be guaranteed in case of network resource shortage. For a non-GRB QoS flow, it is necessary to meet a requirement for rate reduction in case of network resource shortage.

At present, more than 90% of service flows are non-GBR QoS flows, such as common audio and video calls and online conferences. Since changes in wireless network states often result in lagging in audio and video communication, it is desirable to optimize QoS control for non-GBR QoS flows.

SUMMARY

This disclosure provides an application program control method and apparatus, a device, and a storage medium. A QNC mechanism is provided for a non-GBR QoS flow, so that an application entity perceives a change in a wireless network state, and then actively controls running of an application program to adapt to the change. The technical solutions are as follows:

According to an aspect of this disclosure, an application program control method is provided, including:
  receiving, by an application entity, a notification message transmitted by a core entity, the notification message indicating that a change in a parameter value of quality of service notification control (QNC) of a non-guaranteed bit rate (GBR) bearer flow satisfies a reporting condition; and
  controlling, by the application entity, an application program according to the notification message.

According to another aspect of this disclosure, an application program control method is provided, including:
  receiving, by a core entity, a notification message transmitted by an access network device, the notification message indicating that a change in a parameter of quality of service notification control (QNC) of a non-guaranteed bit rate (GBR) flow satisfies a reporting condition; and
  transmitting, by the core entity, the notification message to an application entity, such that the application entity controls traffic of an application program according to the notification message.

According to another aspect of this disclosure, an application program control apparatus is provided, including a memory operable to store computer-readable instructions and a processor circuitry operable to read the computer-readable instructions. When executing the computer-readable instructions, the processor circuitry is configured to
  receive a notification message transmitted from a core entity, the notification message indicating that a change in a parameter value of quality of service notification control (QNC) of a non-guaranteed bit rate (GBR) bearer flow satisfies a reporting condition; and
  control an application program according to the notification message.

According to an aspect of this disclosure, a network element device is provided, including: a processor and a memory, the memory storing a computer program run by the processor to enable the network element device to implement the application program control method as described above.

According to an aspect of this disclosure, a chip is provided, including a programmable logic circuit which, when running, is configured to implement the application program control method as described above.

According to another aspect of this disclosure, a computer-readable storage medium is provided, storing a computer program, and the computer program being loaded and executed by a processor to implement the foregoing application program control method.

According to another aspect of this disclosure, a computer program product is provided, the computer program product including computer instructions, the computer instructions being stored in a computer-readable storage medium. A processor of a computer device reads the computer instructions from the computer-readable storage medium and executes the computer instructions to cause the computer device to perform the application program control method according to the foregoing aspects.

The technical solutions provided in the embodiments of this disclosure include at least the following beneficial effects:

When the increase/decrease of the parameter of the QNC of the non-GBR bearer flow satisfies the reporting condition, the core entity transmits the notification message to the application entity, and after receiving the notification message, the application entity controls the application program according to the notification message. In this manner, a QNC mechanism is provided for the non-GBR bearer flow, so that the application entity may perceive a change in a wireless network state of the non-GBR bearer flow, and then actively control running of the application program to adapt to the change. For example, the computing policy and traffic policy of the application program are controlled, so that when the parameter of the QNC is deteriorated or recovered, the application entity may adjust the application program to adapt to network transmission under this parameter change.

DESCRIPTION OF EMBODIMENTS

Figure 1:
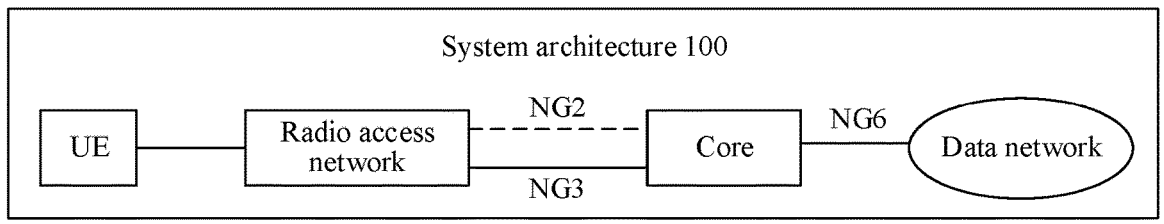
FIG. 1 is a structural block diagram of a mobile communication system according to an exemplary embodiment of this disclosure.

FIG. 1 is a schematic architectural diagram of a mobile communication system according to an exemplary embodiment of this disclosure. As shown in FIG. 1, the system architecture 100 may include user equipment (UE), a radio access network (RAN), a core, and a data network (DN). The UE, the RAN, and the core are main components of the architecture, each of which may be logically divided into two parts: a user plane and a control plane, where the control plane is responsible for management of the mobile network, and the user plane is responsible for transmission of service data. In FIG. 1, reference point NG2 is located between the RAN control plane and the core control plane, reference point NG3 is located between the RAN user plane and the core user plane, and reference point NG6 is located between the core user plane and a data network.

UE: it is a portal for a mobile user to interact with the network, and may provide basic computing power and storage capacity, display a service window to the user, and accept an operational input of the user. The UE may establish a signal connection and a data connection with the RAN by use of a next generation air interface technology so as to transmit a control signal and service data to the mobile network.

RAN: like a base station in a conventional network, it is deployed close to the UE to provide a network access function for an authorized user within coverage of a cell, and may transmit user data using transmission tunnels of different quality according to a user level, a service requirement, etc. The RAN may manage and make reasonable use of its own resources, provide access service for the UE on demand, and forward control signals and user data between the UE and the core.

Core: it is responsible for maintaining subscription data of the mobile network, managing network elements of the mobile network, and providing functions for the UE, such as session management, mobility management, policy management, and security authentication. The core provides network access authentication for the UE when the UE is attached, allocates a network resource to the UE when the UE has a service request, updates the network resource for the UE when the UE moves, provides a fast recovery mechanism for the UE when the UE is idle, releases the network resource for the UE when the UE is detached, and provides a data routing function for the UE when the UE has service data, such as forwarding uplink data to the DN, or receiving, from the DN, and forwarding, to the RAN, downlink data of the UE for transmission to the UE.

DN: it is a data network for providing business service for a user. In general, a client is located in the UE, while a server is located in the data network. The data network may be a private network, such as a local area network, an external network that is not controlled by an operator, such as Internet, or a proprietary network that is co-deployed by the operator, such as to configure IP multimedia network subsystem (IMS) service.

Figure 2:
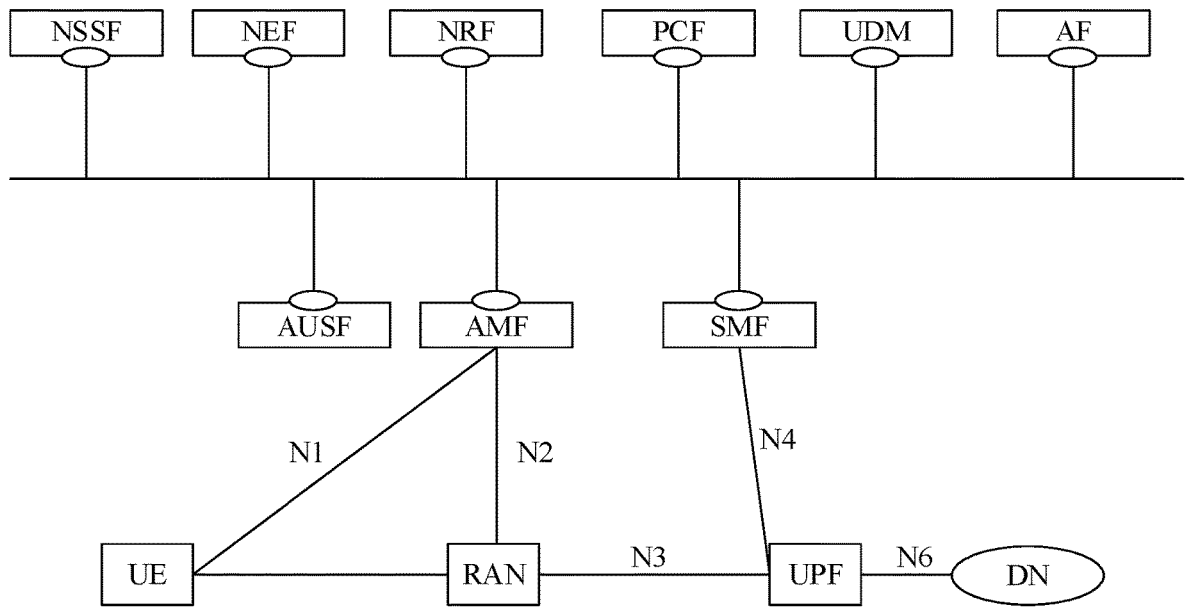
FIG. 2 is a structural block diagram of a mobile communication system according to another exemplary embodiment of this disclosure.

FIG. 2 is a detailed architecture determined based on FIG. 1. The core user plane includes a user plane function (UPF). The core control plane includes an authentication server function (AUSF), an access and mobility management function (AMF), a session management function (SMF), a network slice selection function (NSSF), a network exposure function (NEF), an NF repository function (NRF), unified data management (UDM), a policy control function (PCF), and an application function (AF). Functions of these function entities (referred to as functions or entities for short) are as follows:

UPF: performing user data packet forwarding according to a routing rule of the SMF;
AUSF: performing security authentication of the UE;
AMF: access and mobility management of the UE;
SMF: session management of the UE;
NSSF: selecting a network slice for the UE;
NEF: exposing a network function to a third party by means of an API;

NRF: providing functions of storing and selecting network function entity information for the other network elements;

UDM: user subscription context management;

PCF: user policy management; and

AF: user application management.

In the architecture shown in FIG. 2, an N1 interface is a reference point between the UE and the AMF. An N2 Interface is a reference point between the RAN and the AMF for transmission of a NAS message, etc. An N3 interface is a reference point between the RAN and the UPF for transmitting user plane data, etc. An N4 interface is a reference point between the SMF and the UPF for transmitting tunnel identification information of an N3 connection, data cache indication information, a downlink data notification message, and the other information. An N6 interface is a reference point between the UPF and the DN for transmitting user plane data, etc. A next generation (NG) interface is an interface between a radio access network device and a 5G core.

The names of the interfaces between various network elements in FIGS. 1 and 2 are merely an example, and may be other names in a specific implementation. No specific limits are made thereto in the embodiments of this disclosure. The names of the various network elements (such as the SMF, the AF, and the UPF) in FIGS. 1 and 2 are also merely an example and do not form limitations on the functions of the network elements. In 5G and other future networks, each of the above-mentioned network elements may also have other names, and no specific limits are made thereto in the embodiments of this disclosure. For example, in a 6G network, part or all of the various network elements may be referred to as terms in 5G, or other names, etc., which are collectively described herein and will not be elaborated below. In addition, it is to be understood that the names of messages (or signaling) transmitted between the various network elements are also merely an example and does not form any limitation on the functions of the messages. The various network element entities may be implemented as computer devices, or virtual computer devices running in computer devices.

In the embodiments of this disclosure, a quick change QoS notification control (QCQNC) mechanism is defined for non-GBR QoS flows. The QCQNC mechanism is a type of QNC, referred to as QNC for short. In the QCQNC mechanism provided by the embodiments of this disclosure, the access network device transmits a quick change notification to the SMF when detecting a quick change in at least one QoS parameter of a non-GBR QoS flow. The SMF transmits the quick change notification to the PCF, the AF, and the UE. After receiving the quick change notification, the AF and the UE adjust application programs inside to adapt the application programs to the change, so as to prevent lagging and other phenomena affecting the quality of experience (QoE).

A QoS flow is the smallest QoS distinguishing granularity in a PDU session. A QoS flow ID (QFI) is used in a 5G system to distinguish the QoS flow. The QoS flow is controlled by the SMF. The QoS flow may be pre-configured or created in a PDU session establishment process, or modified in a PDU session modification process.

In the embodiments of this disclosure, the following QoS characteristics are defined for a non-GBR QoS flow:

5G QoS identifier (5QI), allocation and retention priority (ARP), and reflective QoS attribute (RQA).

Corresponding to the 5QI for the non-GBR QoS flow, only the following QoS characteristics are defined:

resource type:

including GBR, delay critical GBR, or non-GBR;

priority level;

packet delay budget (PDB):

the packet data delay (budget) includes a packet delay of the core; and packet error rate (PER).

In the four QoS characteristics, the first two parameters resource type and priority level define characteristics of the 5QI, while the last two parameters PDB and PER define performance of the 5QI.

In the embodiments of this disclosure, it is proposed that a QNC profile includes three parameters about a non GBR QoS flow (NGBF): a PDB, a PER, and a current bit rate (CBR). When detecting that a change rate of increase or decrease of a value of any one of the three parameters (or, a change value of increase or decrease) exceeds a specified threshold (different parameters have different natures, so the parameters correspond to different change rates or change values), the RAN transmits a notification message to the SMF, and notifies change rates or change values of all the parameters. The SMF transmits the notification message to the PCF, the PCF transmits the notification message to the AF, and an application program corresponding to the AF is adjusted correspondingly. Meanwhile, the SMF transmits the notification message to the UE through a NAS message, and an application program corresponding to the UE may also be adjusted correspondingly. As such, interaction between the network and the application is implemented, service transmission is optimized, and the problem of lagging in case of network congestion, or the problem that when the network condition gets better, the application program still uses a very low transmission rate, so network resources may not be fully used and user experience may not be improved is solved.

In an embodiment, two types of parameter changes are defined.

1: Change Value

When the parameter value changes from A to B, B-A is defined as a change value. If a change value of the parameter value from A to B is a first change value, while a change value from B to A is a second change value, magnitudes of the first change value and the second change value are the same (ignoring the plus or minus sign).

2: Change Rate

In an implementation, (B−A)/A is defined as a change rate when the parameter value changes from A to B. If a change rate of the parameter value from A to B is a first change rate (B−A)/A, while a change rate from B to A is a second change rate (A−B)/B, magnitudes of the first change rate and the second change rate are the same (ignoring the plus or minus sign).

That is, the magnitude of (B−A)/A does not equal that of (A−B)/B (assuming B>A>0). Therefore, in the foregoing definition, parameter value A is not restored by increasing parameter value A by 30% to parameter value B and then decreasing parameter value B by 30%.

In an implementation, in order to restore the same parameter value by increasing the same parameter value first by 30% and then decreasing it by 30%, the change rate is uniformly defined as a ratio of the larger value minus the smaller value before and after the change of the parameter value to the smaller value, or the change rate is uniformly defined as a ratio of the larger value minus the smaller value before and after the change of the parameter value to the larger value, or the change rate is uniformly defined as a ratio of the larger value minus the smaller value before and after the change of the parameter value to a fixed value. The larger value is the one with a larger absolute value in the parameter values before and after the change, the smaller value is the one with a smaller absolute value in the parameter values before and after the change, and the fixed value is a predetermined value that remains unchanged. Therefore, when parameter value A increases first by 30% and then decreases by 30%, the original parameter value A is restored.

In an embodiment, the following communication protocols are provided.

QoS Profile

Whether a QoS flow is a GBR or non-GBR flow is determined by its QoS profile. The QoS profile of the QoS flow is transmitted to the (R)AN, including the following QoS parameters (detailed information of the QoS parameters is defined in section 5.7.2 of communication protocol TS23.501).

For each QoS flow, the QoS profile needs to include the following QoS parameters:
5QI; and
ARP.
For each non-GBR QoS flow only, the QoS profile may further include the following QoS parameters:
QCQNC; and
RQA.
For each GBR QoS flow only, the QoS profile may further include the following QoS parameters:
guaranteed flow bit rate (GFBR)-uplink and downlink, and
maximum flow bit rate (MFBR)-uplink and downlink; and
for a GBR QoS flow only, the QoS profile may further include one or more QoS parameters:
notification control; and
maximum packet loss rate-uplink and downlink.

In an embodiment, a QoS quick change notification control profile is provided.

The QoS quick change notification control profile is provided for a non-GBR QoS flow that enables quick change notification control. If a corresponding PCC rule includes relevant information (as described in communication protocol TS 23.503), the SMF also needs to provide a quick change notification control profile for the NG-RAN in addition to a QoS profile. If the SMF provides the quick change notification control profile for the NG-RAN (if the information of the corresponding policy and charging control (PCC) rule changes), the NG-RAN may replace the previously stored profile with it.

The quick change notification control proile indicates a quick change of any QoS parameter: the PDB, the PER, and the detected current bit rate (CBR), which helps the application program control traffic of the application program according to the changed QoS parameter. The quick change notification control profile indicates a quick change (increase or decrease) of (PDB, PER, CBR) within short time (20%, 10%, 30%), and a new value after the change may be continuously retained. That is, the quick change is not a short and quick spike due to sudden impact interference, etc.

Note: the quick change notification control profile may be any change combination of the PDB, the PER, and the CBR.

For example, the quick change notification control profile may set an increased (or decreased) PDB to 20%, or set an increased (or decreased) PDB and PER to 20%, and an increased (or decreased) CBR to 10%, or an increased (or decreased) CBR to 30%.

When the NG-RAN transmits a quick change notification satisfying a QCQNC profile to the SMF, the NG-RAN also needs to include the current QoS parameters (PDB, PER) and CBR in the notification message.

The QNC mechanism of non-GBR bearer flows at least includes the following processes:
1: a notification process of QNC (for the AF);
2: a configuration process of QNC; and
3: an optimization process of QNC.
The above processes are described separately below.

1. Notification Process of QNC (for the AF)

Figure 3:
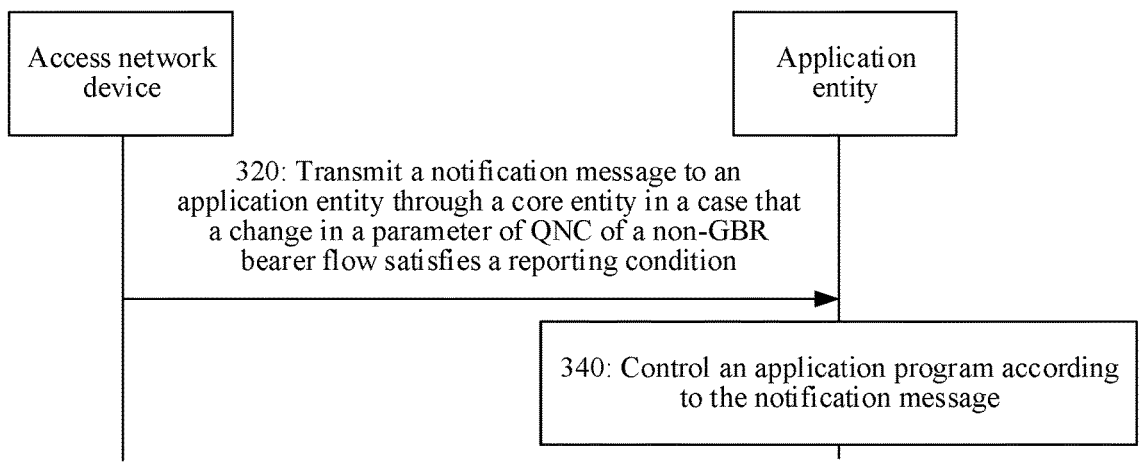
FIG. 3 is a flowchart of a QoS change notification method according to an exemplary embodiment of this disclosure.

FIG. 3 is a flowchart of a QoS change notification method according to an exemplary embodiment of this disclosure. This embodiment is described by using an example in which the method is applied to the mobile communication system shown in FIG. 1 or FIG. 2. The method includes the following steps:

Step 320: An access network device transmits a notification message to an application entity through a core entity when a change in a parameter of QNC of a non-GBR bearer flow satisfies a reporting condition.

The non-GBR bearer flow refers to a bearer flow of a non-GBR type. The non-GBR bearer flow includes a non-GBR QoS flow, or, a non-GBR EPS bearer. Exemplarily, a non-GBR bearer flow in a 5G system is a QoS flow of a non-GBR type, while a non-GBR bearer flow in a 4G system is an EPS bearer of a non-GBR type.

Exemplarily, parameters of QNC (or QCQNC) include at least one of a PDB, a PER, and a CBR. When there are at least two parameters of the QNC, the at least two parameters correspond to a same reporting condition, and/or, the at least two parameters correspond to different reporting conditions.

Exemplarily, the reporting condition (or a change threshold or change reporting threshold) includes at least one of the following:
a change value of the parameter of the QNC within first time is greater than a first threshold,
where the first threshold is a fractional number greater than 0 and less than 1, for example, the first threshold is 20%, 30%, and 40%, and the first time is a period or time for computing the change value, such as 1 second and 2 seconds;
a change rate of the parameter of the QNC within second time is greater than a second threshold,
where the second threshold is a fractional number greater than 0 and less than 1, for example, the second threshold is 20%, 30%, or 40%, and the second time is a period or time for computing the change rate, such as 1 second and 2 seconds;
the change value of the parameter of the QNC within the first time is greater than the first threshold and continuously retained for a third threshold,
where the third threshold is a threshold for measuring retaining time of the change value, such as 2 seconds; and
the change rate of the parameter of the QNC within the second time is greater than the second threshold and is continuously retained for a fourth threshold,
where the fourth threshold is a threshold for measuring retaining time of the change rate, such as 2 seconds.

Exemplarily, the notification message further contains a changed parameter value of the QNC, i.e., a current parameter value of the parameter of the QNC after a quick change in the parameter of the QNC. The "current" is relative rather than absolute. For example, the current parameter value is a parameter value when the reporting condition is triggered, and is not necessarily equal to a real-time parameter value after the notification message is transmitted.

Exemplarily, the changed parameter value of the QNC may be represented by a quantized value of the changed parameter value of the QNC. For example, a value range of the QNC is divided into 16 non-overlapping subintervals. Each of the 16 subintervals corresponds to a unique quantized value, which is represented with four bits. When belonging to an $i^{th}$ subinterval, the changed parameter value of the QNC is represented by the quantized value corresponding to the $i^{th}$ subinterval, which only needs 4 bits. Therefore, transmission resources required by the notification message may be reduced.

Step 340: The application entity controls an application program according to the notification message.

The notification message (or a quick change notification, quick change report, or notification report) is used for indicating that the change in the parameter of the QoS notification control (QNC) of the non-GBR bearer flow satisfies the reporting condition.

The application entity controls at least one of a running parameter, running policy, and traffic of the application program according to the notification message to adapt the application program to the quick change in the relevant parameter of the non-GBR bearer flow.

The application entity runs one or more application programs, and the same application program corresponds to at least one service data flow (SDF). SDFs with different QoS requirements are respectively mapped to independent QoS flows. For example, an SDF with a first QoS requirement is mapped to a first QoS flow, and an SDF with a second QoS requirement is mapped to a second QoS flow. In an exemplary implementation, SDFs with the same QoS requirement may be mapped to the same QoS flow.

In this embodiment of this disclosure, it is assumed that one or more QoS flows corresponding to an application program include a non-GBR QoS flow for transmitting data packets of at least one service of voice, video, text, message, file, control information, etc.

In summary, according to the method provided in this embodiment, when the increase/decrease of the parameter of the QNC of the non-GBR bearer flow satisfies the reporting condition, the core entity transmits the notification message to the application entity, and after receiving the notification message, the application entity controls the application program according to the notification message. In this manner, a QNC mechanism is provided for the non-GBR bearer flow, so that the application entity may perceive a change in a wireless network state of the non-GBR bearer flow, and then actively control running of the application program to adapt to the change. For example, the computing policy and traffic policy of the application program are controlled, so that when the parameter of the QNC is deteriorated or recovered, the application entity may adjust the application program to adapt to network transmission under this parameter change.

The step performed by the access network device may be implemented separately as an embodiment of an access network device side. The step performed by the application entity may be implemented separately as an embodiment of an disclosure entity side.

Figure 4:
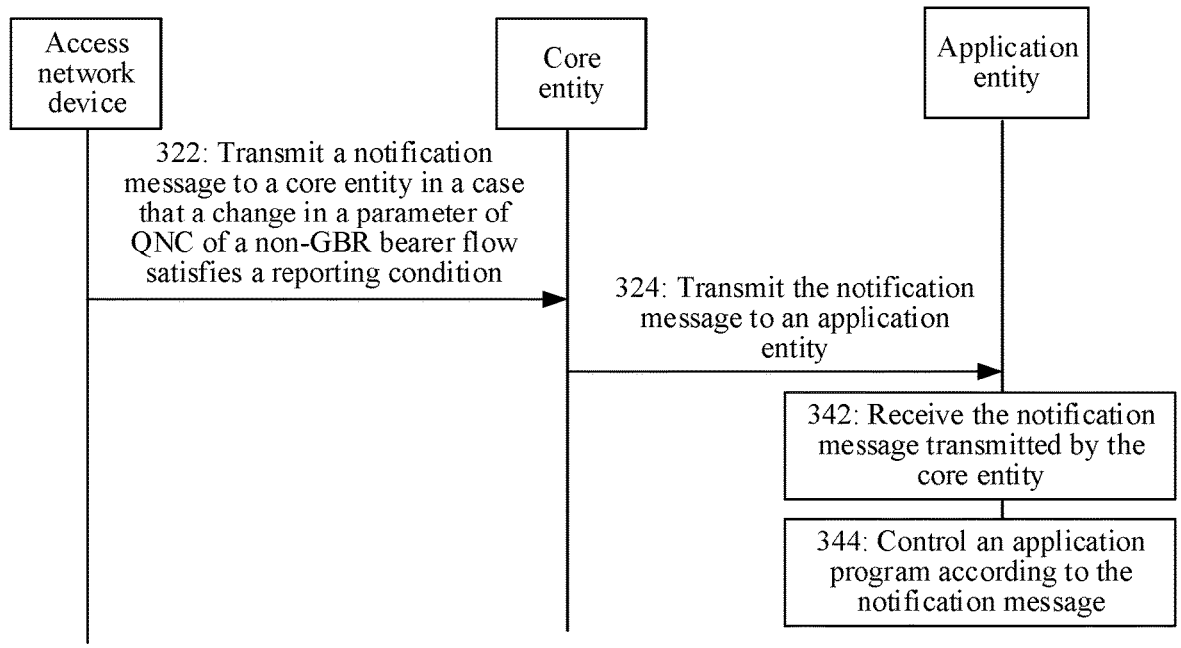
FIG. 4 is a flowchart of a QoS change notification method according to another exemplary embodiment of this disclosure.

FIG. 4 is a flowchart of a QoS change notification method according to another exemplary embodiment of this disclosure. This embodiment is described by using an example in which the method is applied to the mobile communication system shown in FIG. 1 or FIG. 2. The method includes the following steps:

Step 322: An access network device transmits a notification message to a core entity when a change in a parameter of QNC of a non-GBR bearer flow satisfies a reporting condition.

The core entity receives the notification message transmitted by the access network device. The notification message is used for indicating that the change in the parameter of the QoS notification control (QNC) of the non-GBR bearer flow satisfies the reporting condition.

Exemplarily, the notification message further contains a changed parameter value of the QNC, i.e., a current parameter value of the parameter of the QNC after a quick change in the parameter of the QNC. The "current" is relative rather than absolute. For example, the current parameter value is a parameter value when the reporting condition is triggered, and is not necessarily equal to a real-time parameter value after the notification message is transmitted.

Exemplarily, the changed parameter value of the QNC may be represented by a quantized value of the changed parameter value of the QNC. For example, a value range of the QNC is divided into 16 non-overlapping subintervals. Each of the 16 subintervals corresponds to a unique quantized value, which is represented with four bits. When belonging to an $i^{th}$ subinterval, the changed parameter value of the QNC is represented by the quantized value corresponding to the $i^{th}$ subinterval, which only needs 4 bits. Therefore, transmission resources required by the notification message may be reduced.

Step 324: The core entity transmits the notification message to an application entity.

There is one or more core entities. When the notification message involves a plurality of core entities located between a RAN and an AF, the plurality of core entities sequentially transmit the notification message. Different core entities may contain the notification message in different types of messages. For example, the core entity includes: a mobility management entity (MME), a service gateway (SGW), a PDN gateway (PGW), and a PCF. In such case, a transmission path of the notification message at least includes RAN→MME→SGW/PGW→PCF→AF. For another example, the core entity includes: a first core entity AMF, a second core entity SMF, and a third core entity PCF. In such case, a transmission path of the notification message at least includes RAN→AMF→SMF→PCF→AF.

Exemplarily, the core entity transmits event reporting containing the notification message to the application entity.

Step 342: The application entity receives the notification message transmitted by the core entity.

Exemplarily, the application entity receives the event reporting transmitted by the core entity.

Step 344: The application entity controls an application program according to the notification message.

The application entity controls at least one of a computing policy and traffic policy of the application program according to the notification message to adapt the application program to the quick change in the relevant parameter of the non-GBR bearer flow, so as to maximally ensure the QoE of a user and avoid lagging and other phenomena.

Taking an application program at a server side of an online conference as an example, the application program corresponds to four SDFs: a voice SDF, a video SDF, a text message SDF, and a control plane SDF. The four SDFs correspond to four non-GBR QoS flows. A QNC mechanism is enabled for each of the four non-GBR QoS flows.

First Exemplary Implementation the application program is controlled, in response to the notification message being used for indicating deterioration of the parameter value of the QNC, to be executed according to a first computing policy; and the application program is controlled, in response to the notification message being used for indicating improvement of the parameter value of the QNC, to be executed according to a second computing policy, computing time of a same computing task under the first computing policy being less than that under the second computing policy.

The computing policy is a policy about running computation of the application program. The computing policy includes, but not limited to, at least one of an encoding and decoding mode selection policy, an encoding and decoding model selection policy, an encoding and decoding level selection policy, a compression level selection policy, and a neural network model selection policy.

Taking the computing policy being the encoding and decoding mode selection policy as an example, the application program is controlled, in response to the notification message being used for indicating deterioration of the parameter value of the QNC, to perform encoding and decoding in a first encoding and decoding mode; and the application program is controlled, in response to the notification message being used for indicating improvement of the parameter value of the QNC, to perform encoding and decoding in a second encoding and decoding mode. "Encoding and decoding" herein refers to at least one of encoding and decoding.

Computing time of a same computing task under the first encoding and decoding mode is less than that under the second encoding and decoding mode.

For example, when a PDB increases, although a network delay increases, the application program may compensate for the deterioration of the network delay by reducing internal computing time to still ensure that an overall transmission delay remains unchanged or changes a little. For example, if a PDB of a non-GBR QoS flow corresponding to a video is deteriorated, an encoding rate of the video is reduced to reduce the number and/or size of video data packets.

Second Exemplary Implementation the application program is controlled, in response to the notification message being used for indicating deterioration of the parameter value of the QNC, to be executed according to a first traffic policy; and the application program is controlled, in response to the notification message being used for indicating improvement of the parameter value of the QNC, to be executed according to a second traffic policy, traffic of the first traffic policy being less than that of the second traffic policy.

Exemplarily, traffic of the application program includes a voice data packet and a video data packet.

In response to the notification message being used for indicating deterioration of the parameter value of the QNC, first traffic corresponding to the voice data packet is retained, and second traffic corresponding to the video data packet is reduced. In response to the notification message being used for indicating improvement of the parameter value of the QNC, the first traffic corresponding to the voice data packet is retained, and the second traffic corresponding to the video data packet increased.

For example, when a PDB increases, traffic of a first non-GBR QoS flow corresponding to a video is reduced, and traffic of a second non-GBR QoS flow corresponding to a voice is retained. Therefore, the overall radio resource occupation is reduced to improve the transmission quality of the voice data packet and reduce interference.

This is because in a cloud-based application (video conferencing, voice conferencing, distance learning), bi-directional interaction of video and voice is usually required. There is a certain requirement for network transmission delay (generally, the one-way transmission delay is less than 150 ms). However, in practical use, a change in a wireless network state makes the transmission delay of the wireless network suddenly deteriorated or the transmission rate suddenly decrease within a period of time (such as 5 seconds), resulting in audio and video lagging.

Relevant studies have shown that users are very sensitive to audio lagging but not so sensitive to changes in video quality (such as changes in resolution and changes in clarity) (it is acceptable to temporarily turn off the video with the voice retained). Lagging occurs not so often for audio because its transmission data is typically small. However, the user experience is very poor when the audio is lagging. In addition, even though the audio is reduced from the quality of CD to a very low transmission rate (such as 2G voice transmission quality), the user still has a very good use experience as long as no lagging occurs.

In summary, according to the method provided in this embodiment, the application entity adjusts the application program according to the changed parameter value of the QNC, so that when the relevant parameter of the non-GBR bearer flow is deteriorated or the relevant parameter of the non-GBR bearer flow is recovered, the application entity may adjust the application program inside to adapt to this parameter change, to optimize running of the application program.

According to the method provided in this embodiment, when the relevant parameter of the non-GBR bearer flow is deteriorated, the computing policy of the application program is further changed, so as to compensate for the deterioration of the network delay by reducing computing time in the application program to still ensure that an overall transmission delay remains unchanged or changes a little.

According to the embodiment provided in this embodiment, when the relevant parameter of the non-GBR bearer flow is deteriorated, the traffic policy of the application program is further changed, for example, the traffic of the voice data packet is retained while the traffic of the video data packet is reduced. Therefore, lagging of the audio affecting more the user experience is avoided, and further, the user experience of the user when using an audio and video program is improved as much as possible.

2. Configuration Process of QNC

In a creation or modification process of the non-GBR bearer flow, the core entity performs a configuration process of the QNC for the access network device. That is, the core entity transmits a QNC profile to the access network device, the QNC profile being used for configuring the parameter of the QNC and the reporting condition (or a change threshold, quick change threshold, change reporting threshold, or quick change reporting threshold)

Figure 5:
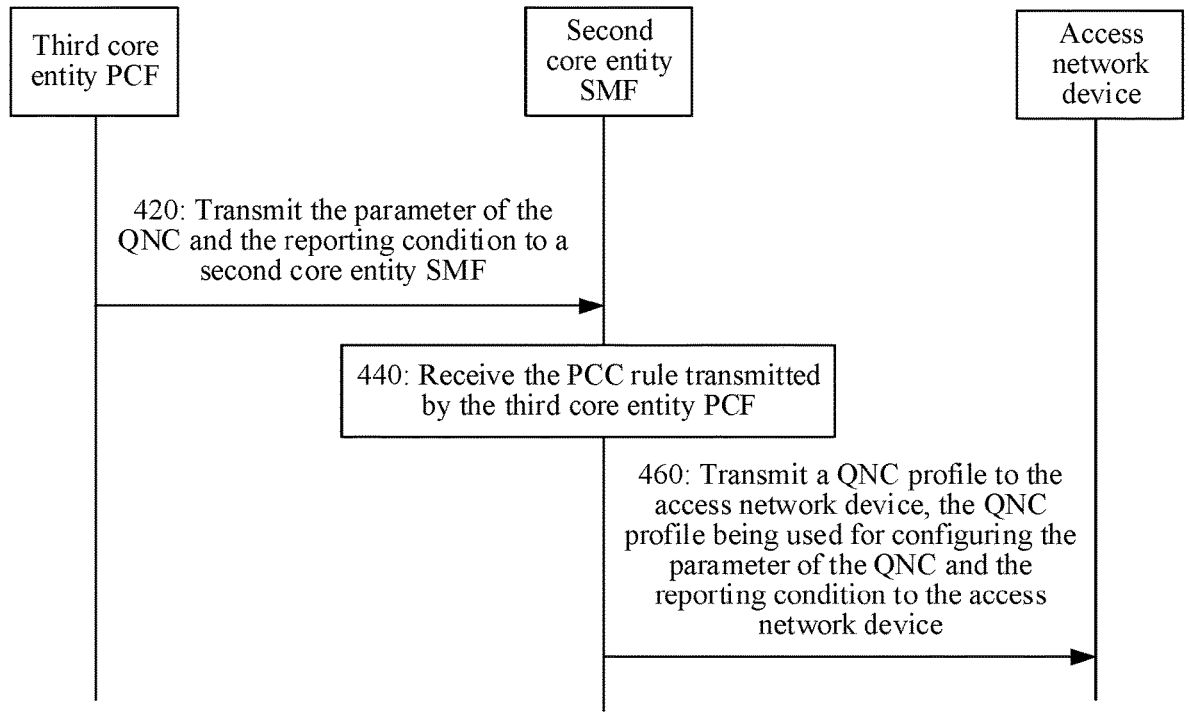
FIG. 5 is a flowchart of a configuration method of QNC according to an exemplary embodiment of this disclosure.

FIG. 5 is a flowchart of a configuration method of QNC according to an exemplary embodiment of this disclosure. This embodiment is described by using an example in which the method is applied to the mobile communication system shown in FIG. 1 or FIG. 2. The method includes the following steps:

Step 420: A third core entity PCF transmits the parameter of the QNC and the reporting condition to a second core entity SMF.

The third core entity is an entity responsible for policy management in a core.

The second core entity is an entity responsible for session management in the core.

Exemplarily, in the creation or modification process of the non-GBR bearer flow, the third core entity PCF transmits the parameter of the QNC and the reporting condition to the second core entity SMF.

Exemplarily, in a PDU session establishment process, a (first) QoS flow is created, which is referred to as a QoS flow with default QoS rules. In general, the QoS flow is of a non-GBR type. The third core entity may provide the parameter of the QNC and the reporting condition for the second core entity.

Exemplarily, the parameter of the QNC and the reporting condition are determined by the third core entity PCF on its own. Alternatively, the parameter of the QNC and the reporting condition are determined by the third core entity PCF based on the service flow information transmitted by the application entity. Alternatively, the parameter of the QNC and the reporting condition are determined by the third core entity PCF based on subscription data of UE.

Step 440: The second core entity SMF receives a PCC rule transmitted by the third core entity PCF.

Step 460: The second core entity transmits a QNC profile to the access network device, the QNC profile being used for configuring the parameter of the QNC and the reporting condition to the access network device.

In summary, according to the method provided in this embodiment, the third core entity transmits the parameter of the QNC and the reporting condition to the second core entity, so that the second core entity may be triggered to configure the parameter of the QNC and the reporting condition for the non-GBR bearer flow, to complete the configuration process of the QNC.

Figure 6:
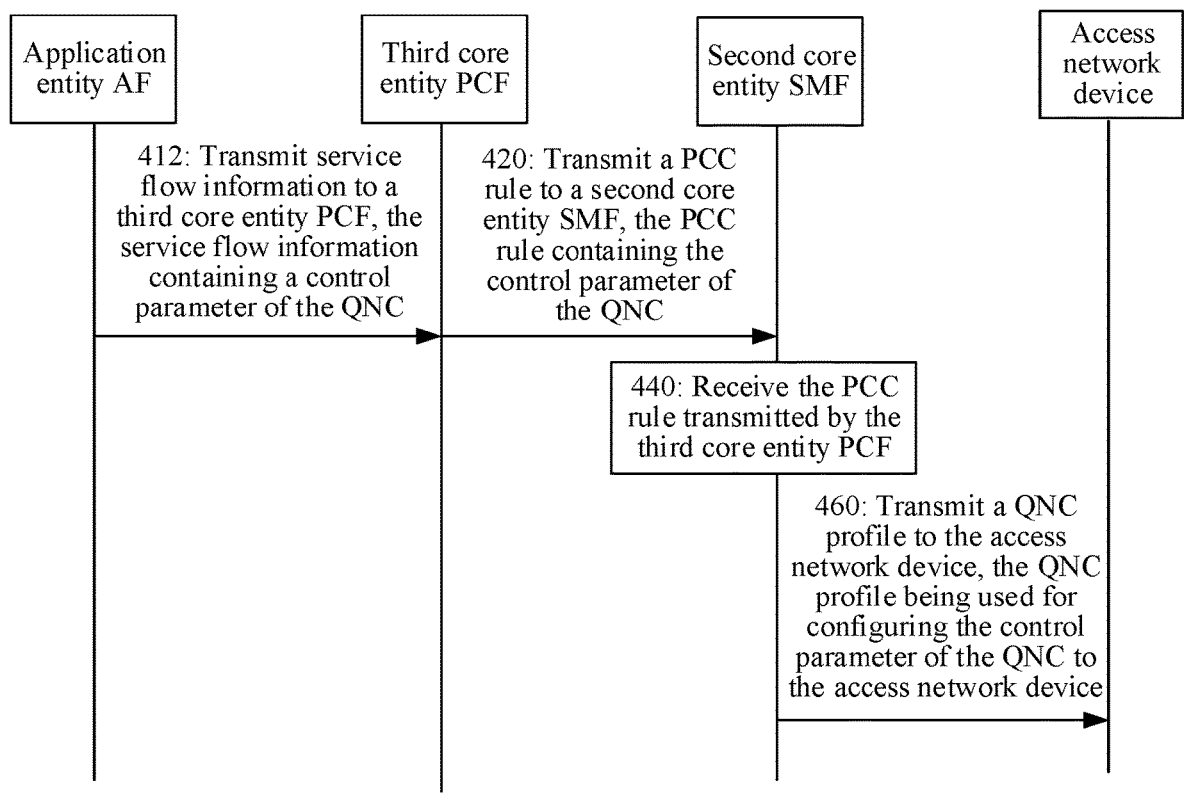
FIG. 6 is a flowchart of a configuration method of QNC according to another exemplary embodiment of this disclosure.
Figure 7:
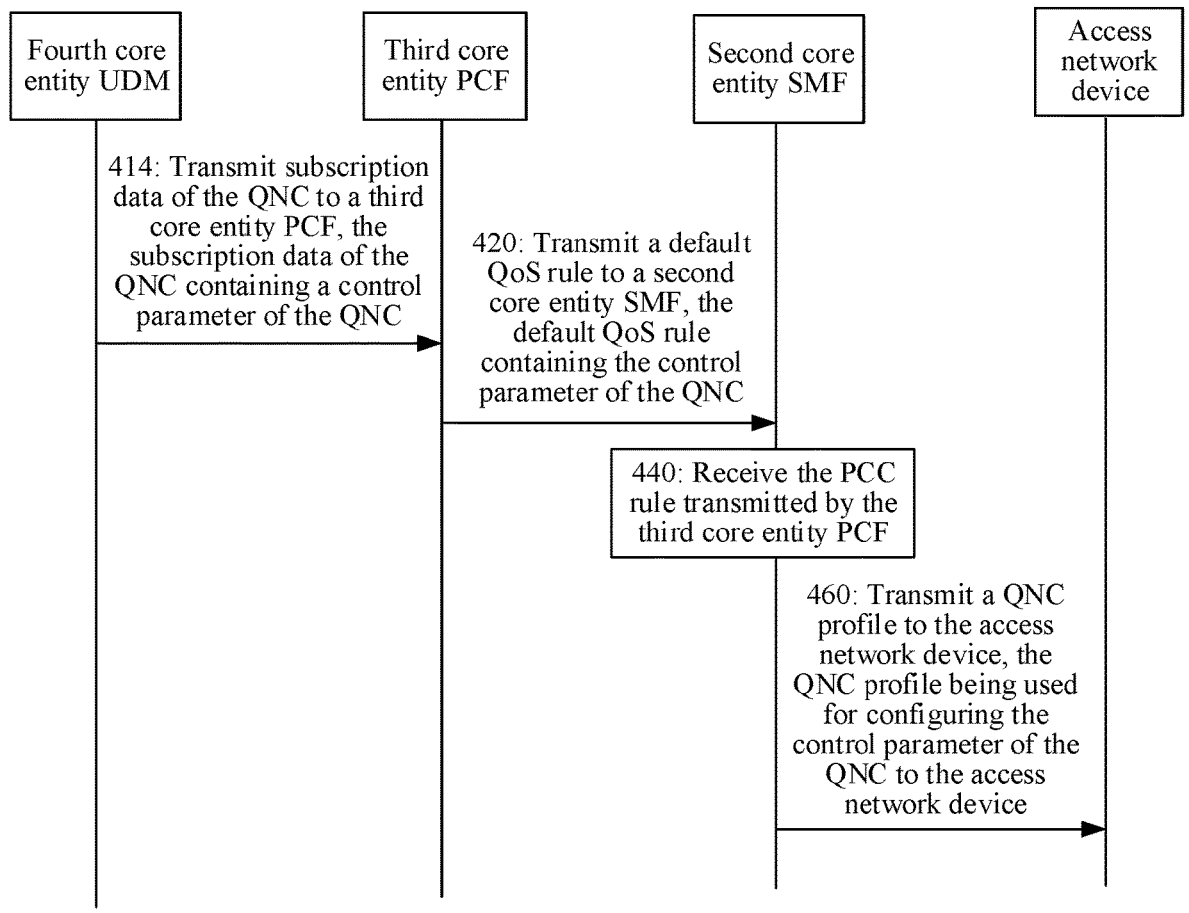
FIG. 7 is a flowchart of a configuration method of QNC according to another exemplary embodiment of this disclosure.

In a design, the application entity provides service flow information for the third core entity, the service flow information containing the parameter of the QNC and reporting condition that are required (or suggested) by the application entity, as shown in FIG. 6. In another design, the third core entity determines the parameter of the QNC and the reporting condition based on subscription data of the QNC, as shown in FIG. 7.

FIG. 6 is a flowchart of a configuration method of QNC according to another exemplary embodiment of this disclosure. This embodiment is described by using an example in which the method is applied to the mobile communication system shown in FIG. 1 or FIG. 2. The method includes the following steps:

Step 412: The application entity AF transmits a control parameter of the QNC to a third core entity PCF.

The control parameter of the QNC includes at least one of whether to enable the QNC, the parameter of the QNC, and a change threshold.

The application entity AF transmits a policy authorization creation/update message to the core entity, the policy authorization creation/update message containing the control parameter of the QNC. Correspondingly, the third core entity PCF receives the policy authorization creation/update message transmitted by the application entity AF.

Step 420: The third core entity PCF transmits a PCC rule to a second core entity SMF, the PCC rule containing the control parameter of the QNC.

Step 440: The second core entity SMF receives the PCC rule transmitted by the third core entity PCF.

Step 460: The second core entity transmits a QNC profile to the access network device, the QNC profile being used for configuring the control parameter of the QNC to the access network device.

In summary, according to the method provided in this embodiment, the application entity provides the control parameter of the QNC for the third core entity, so that active interaction between the application entity and the core entity may be implemented. The application entity drives the radio access network device (such as RAN of 5G or 4G) to report a quick change of the non-GBR bearer flow, so that the radio access network device exposes its network capability to the application entity, providing a new way for innovation of Internet applications.

FIG. 7 is a flowchart of a configuration method of QNC according to another exemplary embodiment of this disclosure. This embodiment is described by using an example in which the method is applied to the mobile communication system shown in FIG. 1 or FIG. 2. The method includes the following steps:

Step 414: A fourth core entity UDM transmits subscription data of the QNC to a third core entity PCF, the subscription data of the QNC containing a control parameter of the QNC.

If a default 5QI is of a non-GBR type, subscription data of the QNC is added for the non-GBR bearer flow. A fourth core entity UDM transmits the subscription data of the QNC to a second core entity SMF, and the second core entity SMF transmits the subscription data of the QNC to a third core entity PCF.

Step 420: The third core entity PCF transmits a default QoS rule to a second core entity SMF, the default QoS rule containing the control parameter of the QNC.

Step 440: The second core entity SMF receives the default PCC rule transmitted by the third core entity PCF.

Step 460: The second core entity transmits a QNC profile to the access network device, the QNC profile being used for configuring the control parameter of the QNC to the access network device.

In summary, according to the method provided in this embodiment, the third core entity determines the control parameter of the QNC based on subscription data of UE, such that the radio access network device may be driven based on the subscription data of the UE to report a quick change of the non-GBR bearer flow to the UE when there is no AF providing the control parameter of the QNC.

3. Optimization Process of QNC

When the third core entity PCF or the application entity AF discovers the notification message of the QNC too frequently, there is brought to the system a large amount of signaling. In such case, the third core entity PCF or the application entity AF needs to modify the reporting condition of the QNC, such as increasing the change threshold.

Figure 8:
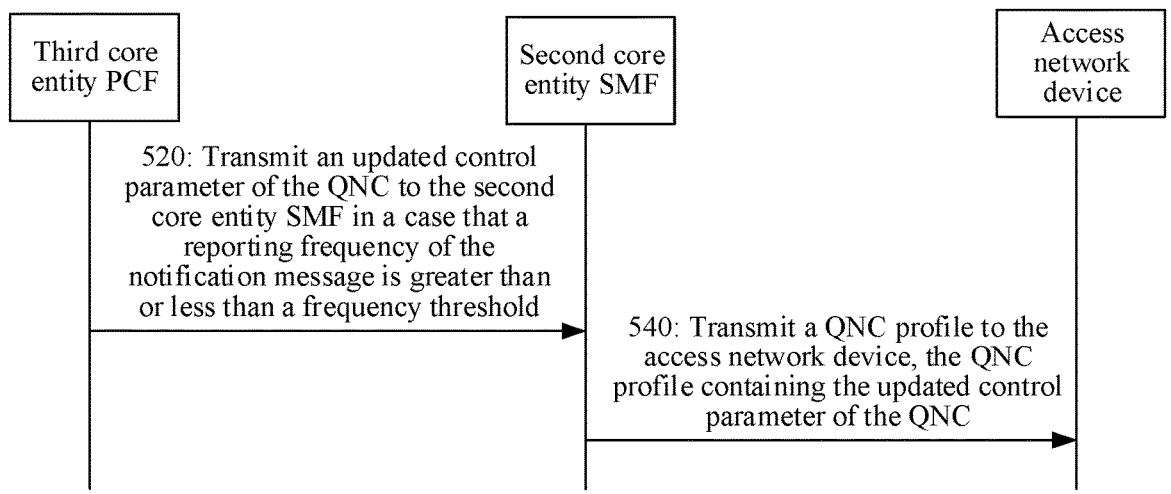
FIG. 8 is a flowchart of an optimization method of QNC according to an exemplary embodiment of this disclosure.

FIG. 8 is a flowchart of an optimization method of QNC according to an exemplary embodiment of this disclosure. This embodiment is described by using an example in which the method is applied to the mobile communication system shown in FIG. 1 or FIG. 2. The method includes the following steps:

Step 520: The third core entity PCF transmits an updated control parameter of the QNC to the second core entity SMF when a reporting frequency of the notification message is greater than or less than a frequency threshold.

The updated control parameter of the QNC includes: at least one of whether to enable the QNC, an updated parameter of the QNC, and an updated change threshold. That is, the updated control parameter of the QNC may update at least one of enable the QNC, the parameter of the QNC, and the change threshold.

For example, the third core entity PCF transmits an instruction of disabling the QNC to the second core entity SMF when the reporting frequency of the notification message is greater than the frequency threshold. For another example, the third core entity PCF transmits a reduced parameter of the QNC to the second core entity SMF when a reporting frequency of the notification message is greater than the frequency threshold. For another example, the third core entity PCF transmits an increased change threshold to the second core entity SMF when the reporting frequency of the notification message is greater than the frequency threshold.

Step 540: The second core entity SMF transmits a QNC profile to the access network device, the QNC profile containing the updated control parameter of the QNC.

In summary, according to the method provided in this embodiment, the updated control parameter of the QNC is transmitted to the second core entity SMF and the access network device in the case that the reporting frequency of the notification message is greater than or less than the frequency threshold. Therefore, the system may be prevented from a relatively high signaling overhead, or, the QNC mechanism is reasonably used.

Figure 9:
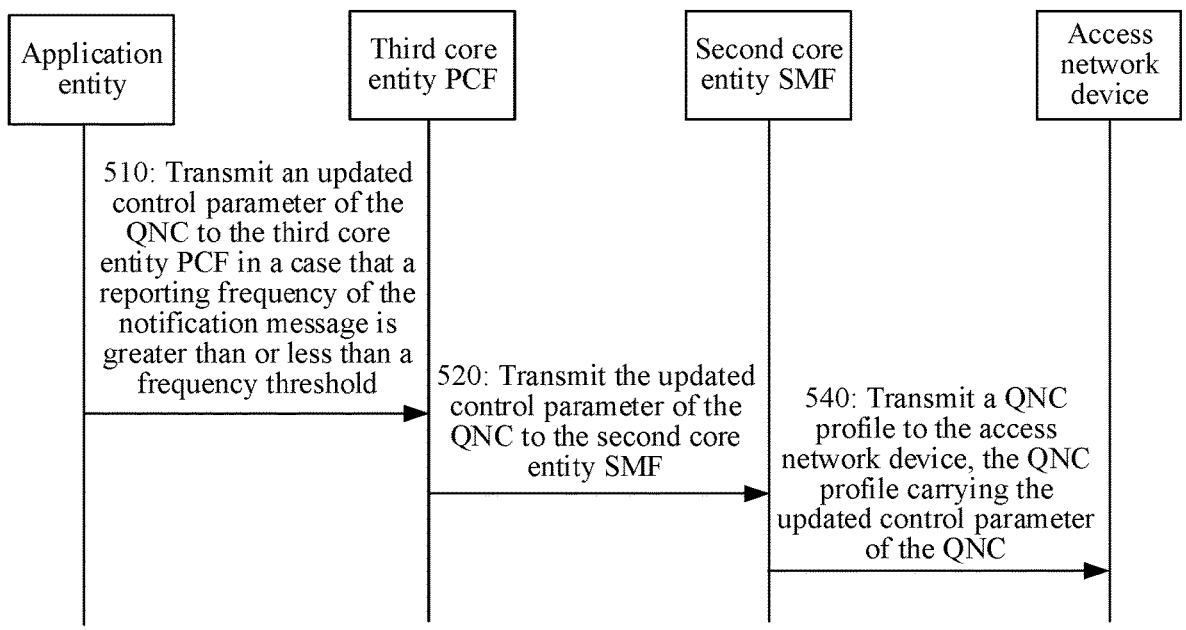
FIG. 9 is a flowchart of an optimization method of QNC according to another exemplary embodiment of this disclosure.

FIG. 9 is a flowchart of an optimization method of QNC according to another exemplary embodiment of this disclosure. This embodiment is described by using an example in which the method is applied to the mobile communication system shown in FIG. 1 or FIG. 2. The method includes the following steps:

Step 510: The application entity transmits an updated control parameter of the QNC to the third core entity PCF when a reporting frequency of the notification message is greater than or less than a frequency threshold.

The updated control parameter of the QNC includes: at least one of whether to enable the QNC, an updated parameter of the QNC, and an updated change threshold. That is, the updated control parameter of the QNC may update at least one of enable the QNC, the parameter of the QNC, and the change threshold.

For example, the AF transmits an instruction of disabling the QNC to the third core entity PCF when the reporting frequency of the notification message is greater than the frequency threshold. For another example, the AF transmits a reduced parameter of the QNC to the third core entity PCF when a reporting frequency of the notification message is greater than the frequency threshold. For another example, the AF transmits an increased change threshold to the third core entity PCF when the reporting frequency of the notification message is greater than the frequency threshold.

Step 520: The third core entity PCF transmits the updated control parameter of the QNC to the second core entity SMF.

Step 540: The second core entity SMF transmits a QNC profile to the access network device, the QNC profile containing the updated control parameter of the QNC.

In summary, according to the method provided in this embodiment, the AF triggers the PCF to transmit the updated control parameter of the QNC to the second core entity SMF and the access network device in the case that the reporting frequency of the notification message is greater than or less than the frequency threshold. Therefore, the system may be prevented from a relatively high signaling overhead, or, the QNC mechanism is reasonably used.

The foregoing process is described in more detail below in connection with the third generation partnership project (3GPP) communication protocol (TS23.502). Details about the names of the network elements, step flows, and steps in the following drawings may refer to related records in TS23.502 (https://www.3gpp.org/ftp/Specs/archive/23_series/23.502). Limited by space, this document highlights differences between the embodiments of this disclosure and the TS23.502 protocol.

1. Notification Process of QNC

When a network where UE is located changes, namely a base station detects a quick change (getting better or poorer) in radio resources, if this change reaches a change threshold defined by QNC, a RAN triggers a notification process of the QNC, and transmits a notification message to an AF. In an exemplary implementation, the notification message contains a parameter value (current parameter value) of a changed parameter of the QNC. The base station transmits the notification message first to an SMF, then the SMF transmits the notification message to a PCF, and then the PCF transmits the notification message to the AF.

Non-roaming and Local Breakout Roaming Scenarios

Figure 10:
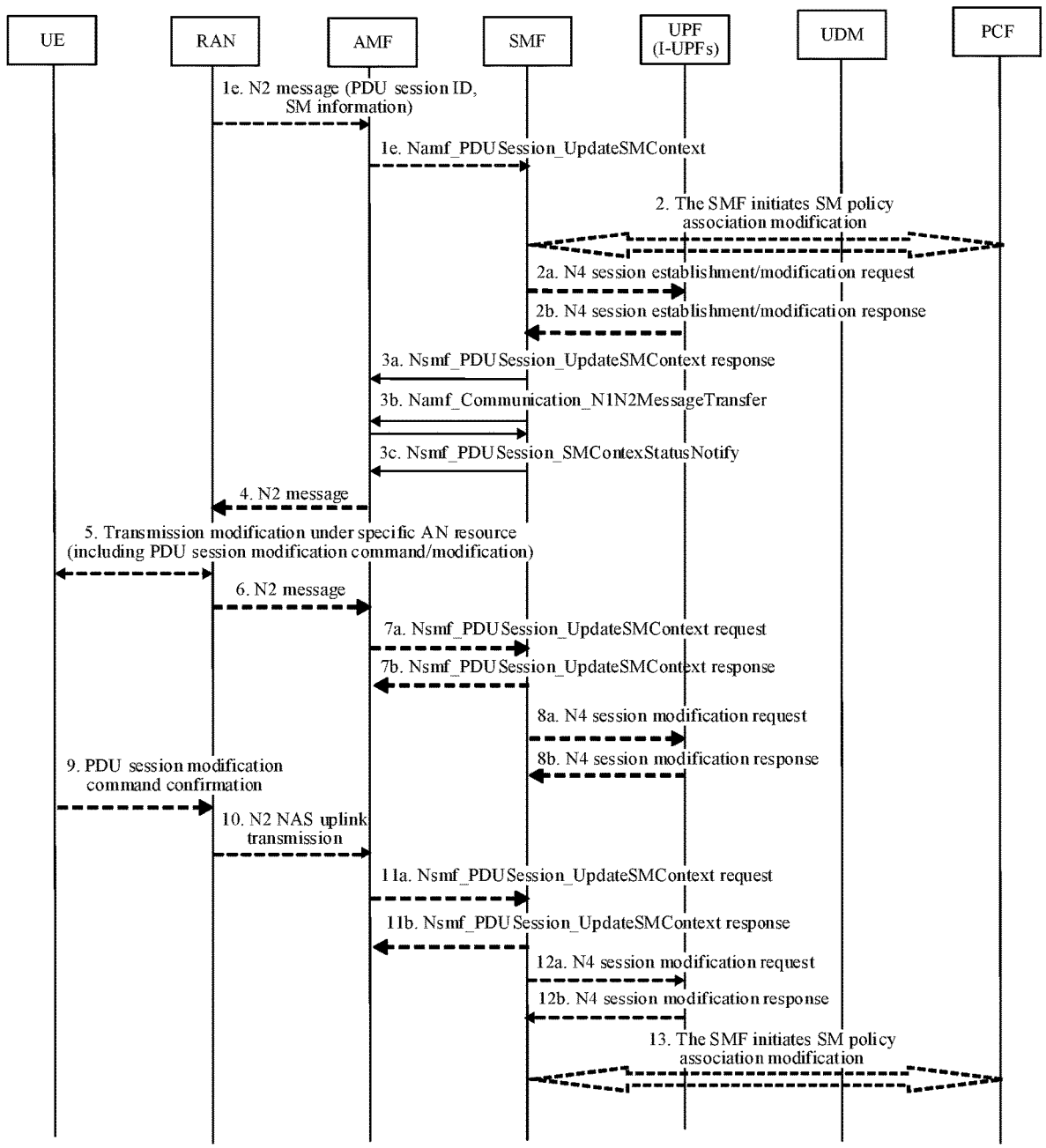
FIG. 10 is a schematic diagram of a PDU session modification process (for non-roaming and local breakout roaming) requested by UE or a network according to an exemplary embodiment of this disclosure.

FIG. 10 is a schematic diagram of a PDU session modification process (for non-roaming and local breakout roaming) requested by UE or a network according to an exemplary embodiment of this disclosure.

In step 1e, the RAN transmits an N2 message (PDU session ID, SM information) to an AMF, and the AMF transmits an Namf_PDUSession_UpdateSMContext message to the SMF.

The two messages contain a notification message when a parameter of QNC of a non-GBR bearer flow satisfies a reporting condition. In an exemplary implementation, the notification message further contains a changed parameter value of the QNC.

In step 2, the SMF initiates a session management (SM) policy association modification process, and transmits the notification message to the PCF and the AF.

In step 5, the SMF transmits a PDU session modification command to the UE to transmit the changed parameter value of the QNC to the UE.

Exemplarily, after a period of time after the SM receives the notification message, if the SMF does not receive any new PCC rule from the PCF or there is no modification about QoS in a PCC rule for an SDF corresponding to the QNC in received PCC rules, the SMF initiates a PDU session modification command to the UE to notify the UE of a current parameter value (PDB, PER, CBR) of the QNC of a QFI corresponding to the current QNC.

In step 9, the UE responds with a PDU session modification confirmation.

The PDU session modification command and the PDU session modification confirmation are transparently transmitted between the UE and the SMF through the RAN.

Figure 11:
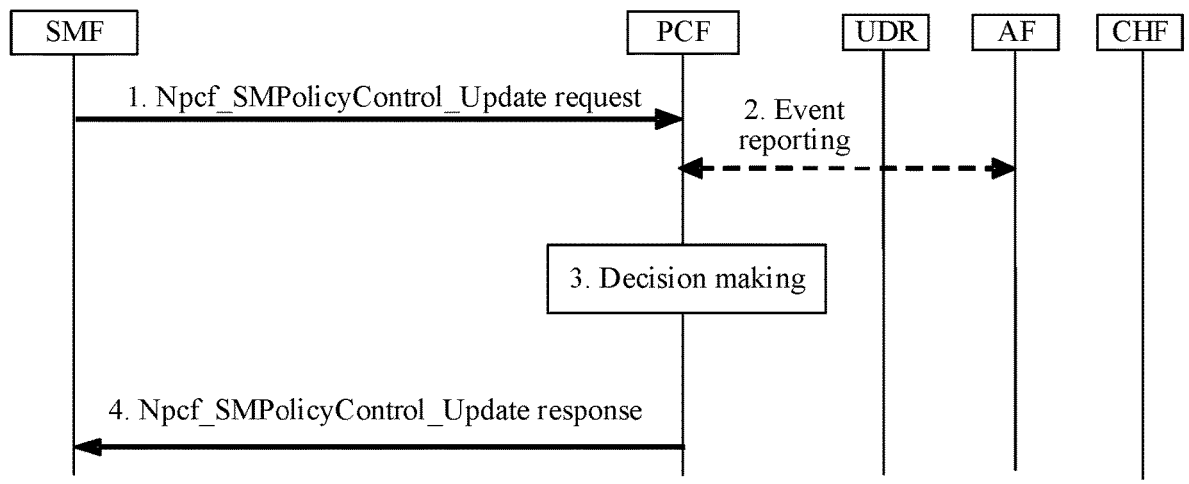
FIG. 11 is a schematic diagram of an SM policy association modification process according to an exemplary embodiment of this disclosure.

The SM policy association modification process shown in step 2 is defined by FIG. 11. As shown in FIG. 11:

In step 1, the SMF transmits an Npcf_SMPolicyControl_Update request to the PCF, the request containing the notification message.

In step 2, the PCF transmits event reporting Npcf_PolicyAuthorizationNotify to the AF, the event reporting containing the notification message.

2. Configuration Process of QNC

Figure 12:
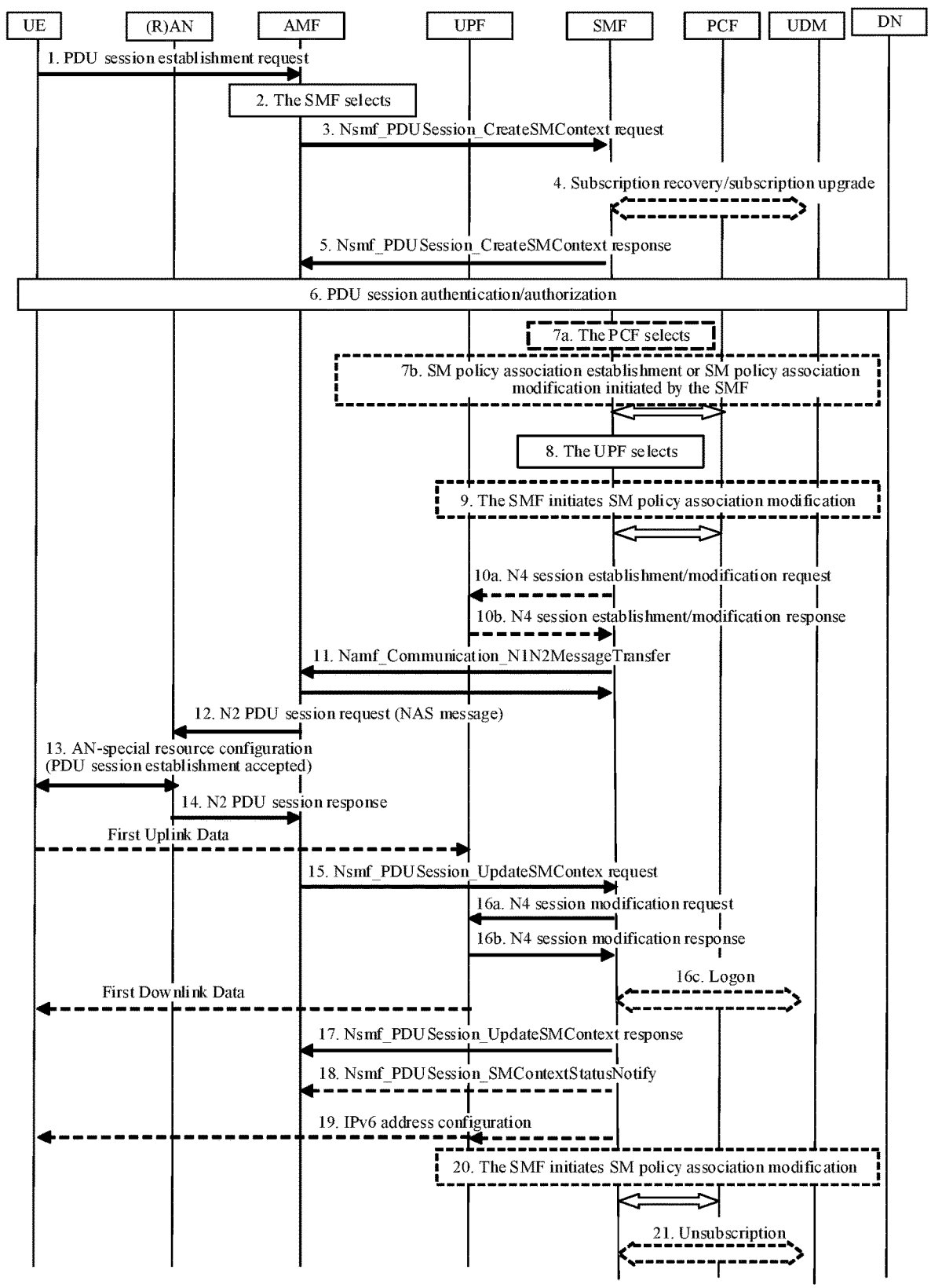
FIG. 12 is a schematic diagram of a PDU session establishment process requested by UE according to an exemplary embodiment of this disclosure.

2.1 PDU Session Establishment Scenarios for Non-roaming and Local Breakout Roaming FIG. 12 is a schematic diagram of a PDU session establishment process requested by UE according to an exemplary embodiment of this disclosure.

In steps 7b and 9, the SMF transmits a new SM policy association establishment request message to the PCF, and the PCF transmits an SM policy association establishment response message to the SMF, the message containing a control parameter of the QNC. Alternatively, the SMF transmits an SM policy association modification request message to the PCF, and the PCF transmits an SM policy association modification response message to the SMF, the message containing a control parameter of the QNC.

In a PDU session establishment process, a QoS flow (generally the first) is created, which is referred to as a QoS flow with default QoS rules (no longer referred to as a default QoS flow in 5G like a default bearer in 4G).

In general, this QoS flow with default QoS rules is of a non-GBR type, and then the PCF may include a control parameter of QNC in a PCC rule. In such case, in step 7b or 9 in FIG. 12, if a 5QI in a default QoS rule provided by the PCF is of a non-GBR type, the PCF may provide a control parameter of QCQNC to the SMF.

In steps 11 and 12, the SMF transmits an Namf_Communication_N1N2 information conversion message to the AMF, the message containing a QNC profile according to the control parameter of the QCQNC provided by the PCF.

In an exemplary implementation, subscription data of the UE includes a default 5QI and a default ARP. If the default 5QI is of the non-GBR type, subscription data of the QNC is added.

In steps 4, 7b and 9, the UDM provides a message containing subscription data of the QNC to the SMF, the SMF then provides the subscription data of the QNC to the PCF, and then the PCF provides a default QoS rule containing the control parameter of the QNC.

The PDU session establishment process may be used for PDU session handover from N3GPP to 3GPP. If the PCF provides the control parameter of the QNC for any non-GBR QoS flow in step 7b or 9, the control parameter of the QNC is added in steps 11 and 12, like the previous description.

There may be multiple non-GBR QoS flows being processed.

The SM-related parameter in the N2 message in step 12 is included in step 11, so that the control parameter of the QNC is included in step 11.

2.2 Home-routed Roaming Scenario

Figure 13:
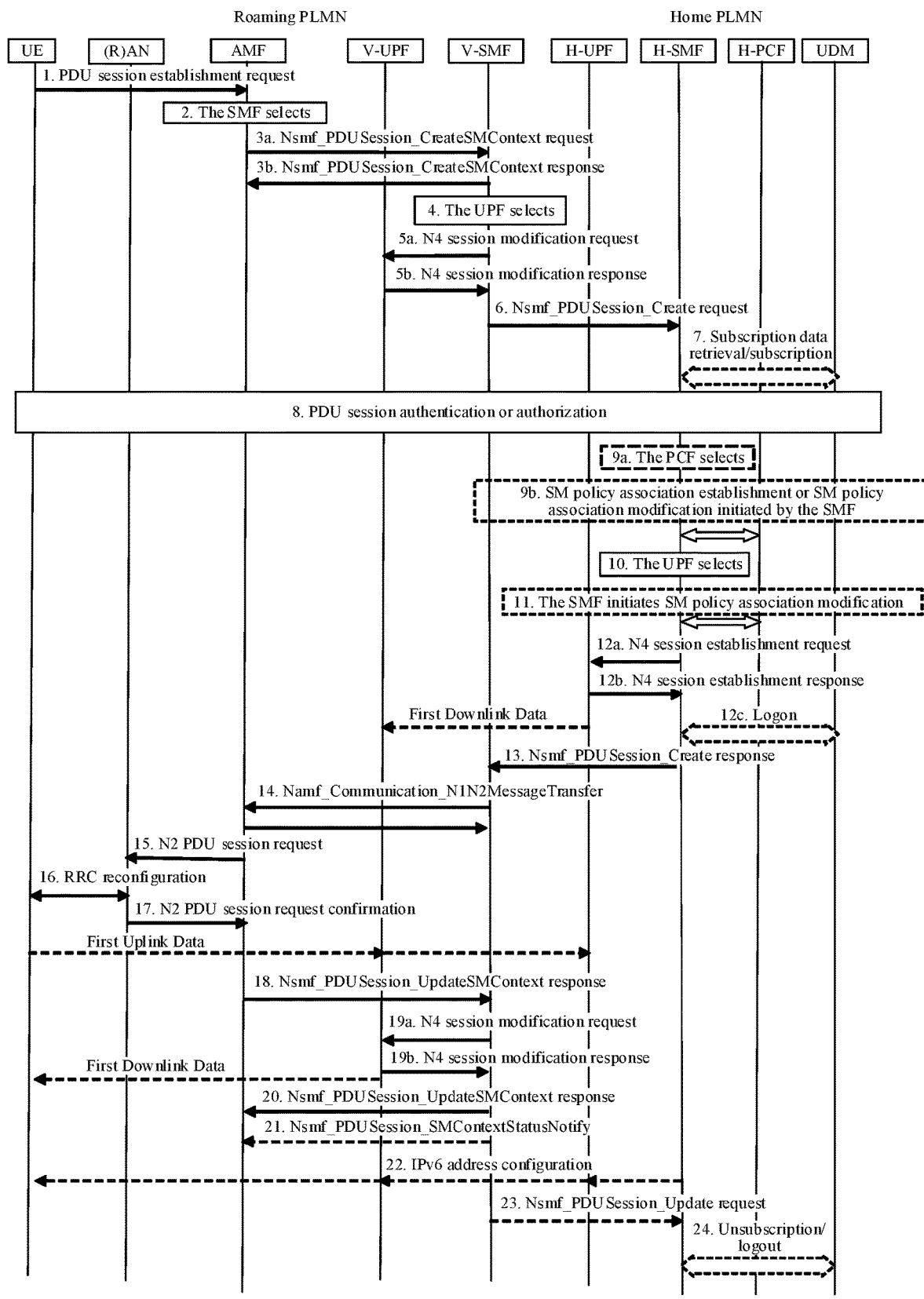
FIG. 13 is a flowchart of a PDU session establishment process requested by UE in a home-routed roaming scenario according to an exemplary embodiment of this disclosure.

FIG. 13 is a flowchart of a PDU session establishment process requested by UE in a home-routed roaming scenario according to an exemplary embodiment of this disclosure.

In a PDU session establishment process, a QoS flow (generally the first) is created, which is referred to as a QoS flow with default QoS rules (no longer referred to as a default QoS flow in 5G like a default bearer in 4G).

In general, this QoS flow with default QoS rules is of a non-GBR type, and then the PCF may include a control parameter of QNC in a PCC rule. In such case, if a 5QI in a default QoS rule provided by the PCF in a message in step 9b or 11 in FIG. 13 is of a non-GBR type, the PCF may provide the control parameter of the QNC. Then, a QNC profile is added to messages in steps 13, 14, and 15.

In an exemplary implementation, subscription data of the UE includes a default 5QI and a default ARP. If the default 5QI is of the non-GBR type, subscription data of the QNC is added.

In steps 7, 9b, and 11, the UDM provides subscription data of the QNC to the SMF, the SMF provides the subscription data of the QNC to the PCF, and then the PCF provides a default QoS rule containing the control parameter of the QNC.

Figure 14:
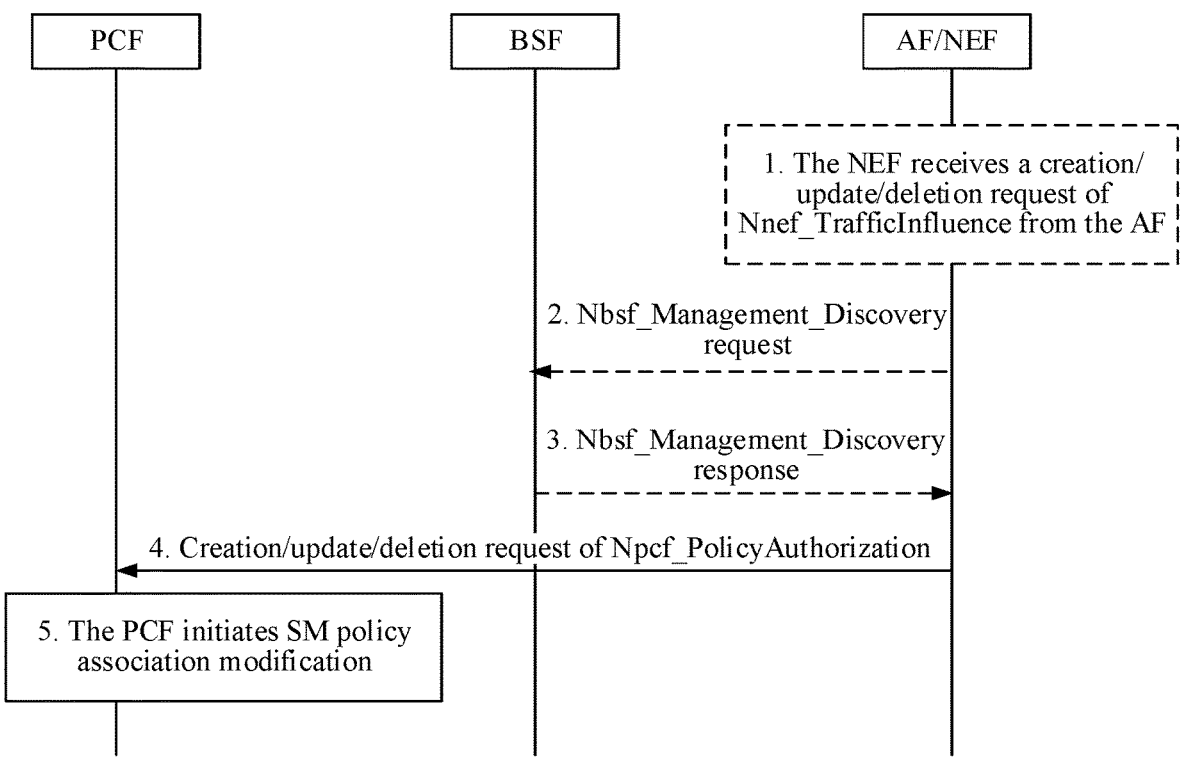
FIG. 14 is a schematic diagram of a process of transferring to a related PCF in response to a request of an AF for a single UE address according to an exemplary embodiment of this disclosure.
Figure 15:
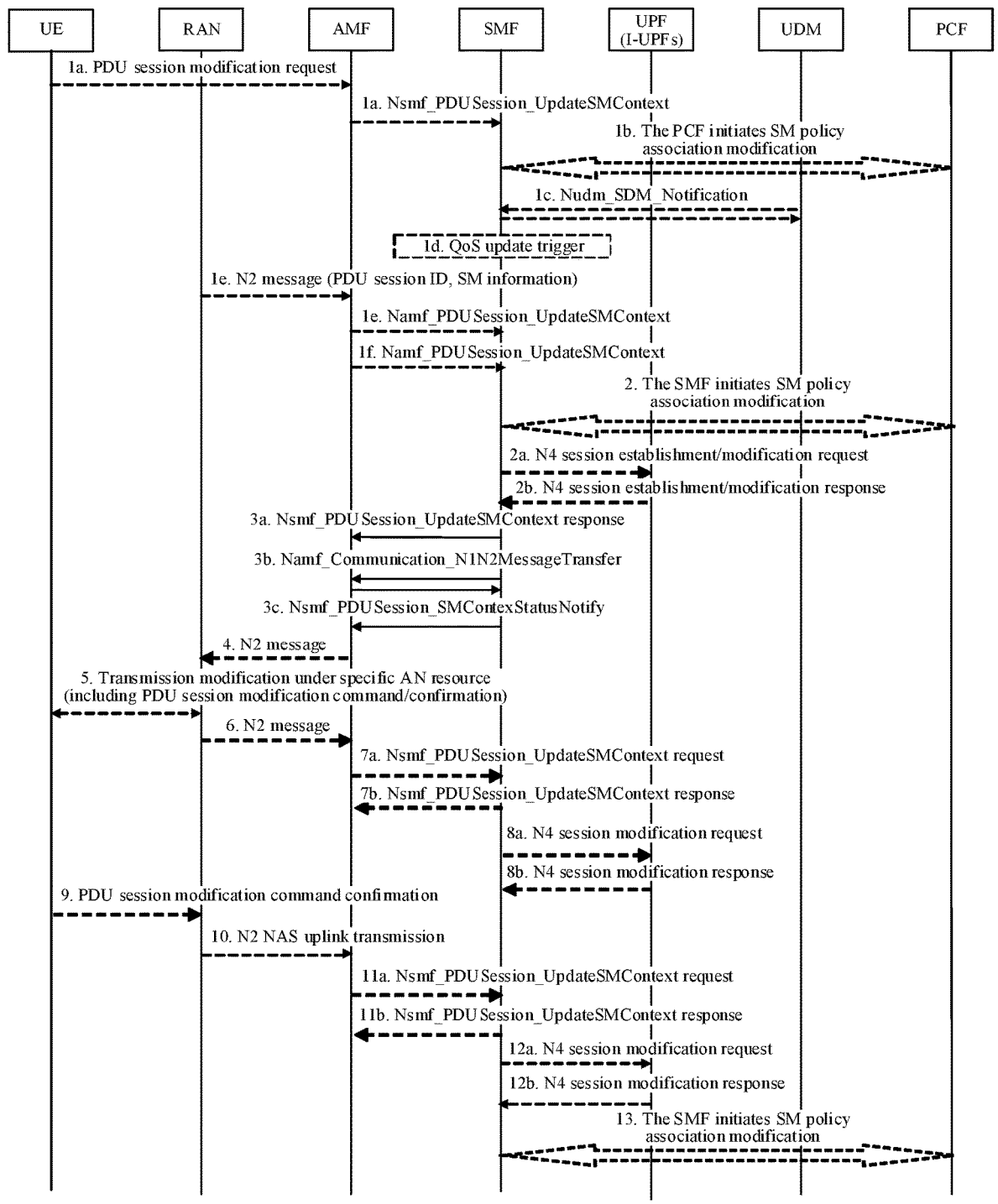
FIG. 15 is a schematic diagram of a PDU session modification process requested by UE or a network for non-roaming and local breakout roaming according to an exemplary embodiment of this disclosure.

2.3 QoS Flow Creation Process Triggered by the AF for Non-roaming and Local Breakout Roaming Scenarios FIG. 14 is a schematic diagram of a process of transferring to a related PCF in response to a request of an AF for a single UE address according to an exemplary embodiment of this disclosure. FIG. 15 is a schematic diagram of a PDU session modification process requested by UE or a network for non-roaming and local breakout roaming according to an exemplary embodiment of this disclosure.

In step 4 in FIG. 14, the AF transmits an Npcf PolicyAuthorization Create/Update message to the PCF, a control parameter of QNC being added to information of (one or more) media components in the message. As mentioned above, if the media component includes the control parameter of the QNC, the media component is requested to be transmitted on an NGBF. If the media component does not include any parameter of QCQNC, it indicates that the media component may be transmitted on an NGBF or a GBR QoS flow (GBF).

In step 1b in FIG. 15, the PCF transmits an Npcf SMPolicyControlUpdateNotify request message. In the request message, a control parameter of the QNC is added to a PCC rule for (one or more) service data flow/flows (SDF/SDFs) (one SDF corresponds to one media flow provided by the AF).

Accordingly, messages in steps 3b and 4 in FIG. 15 contain the control parameter of the QNC.

2.4. QoS Flow Creation Process Triggered by the AF for a Home-routed Roaming Scenario FIG. 16 is a schematic diagram of a PDU session modification process requested by UE or a network for home-routed roaming according to an exemplary embodiment of this disclosure.

Figure 16:
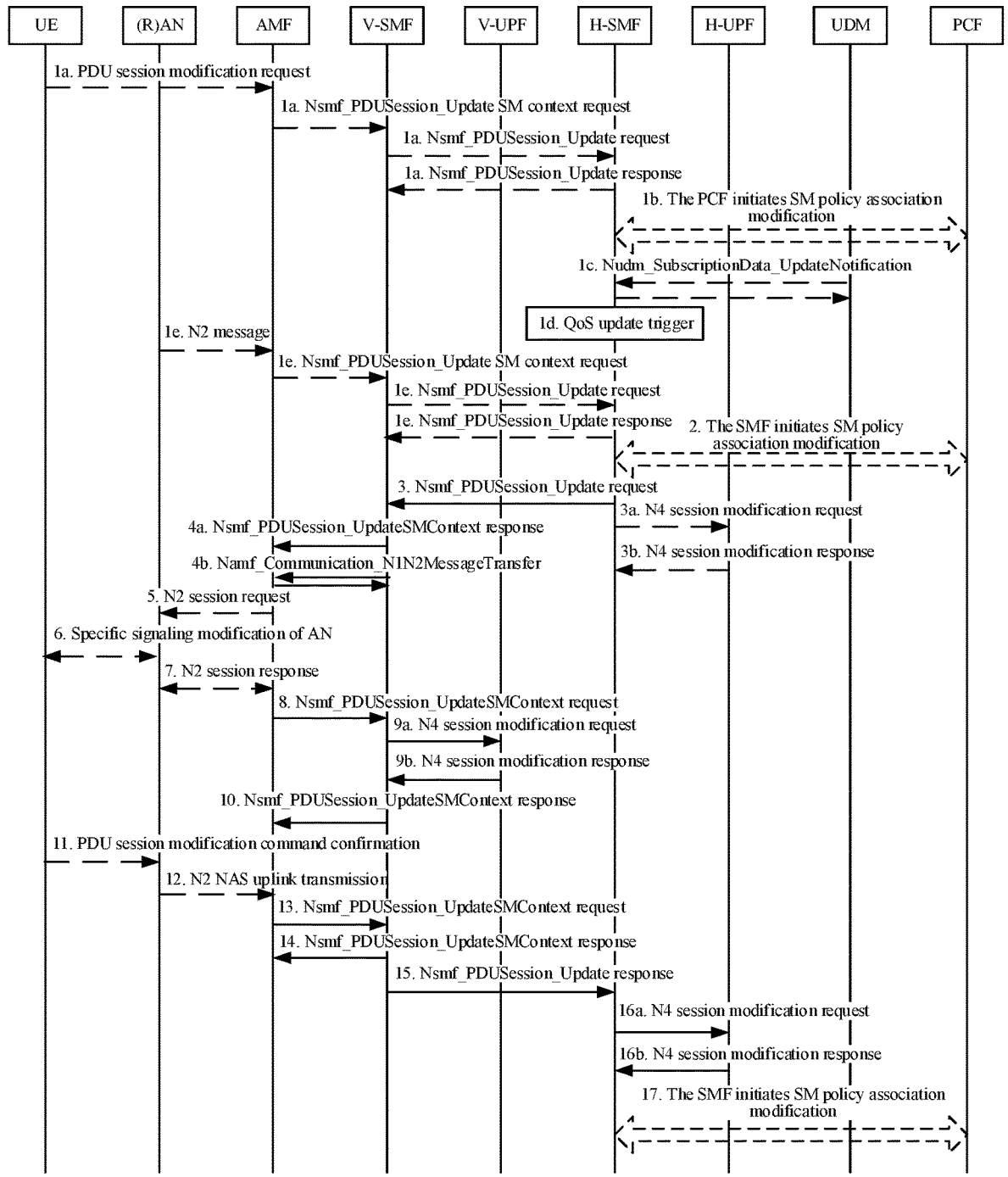
FIG. 16 is a schematic diagram of a PDU session modification process requested by UE or a network for home-routed roaming according to an exemplary embodiment of this disclosure.

In steps 1b, 3, 4b, and 5 in FIG. 16, control parameters of one or more QNC (i.e., each possible service flow, SDF, and QoS flow) are added.

Step 3 in FIG. 16 is a new step relative to the scenario described in FIG. 15. That is, a control parameter of QNC is added to QoS parameters of one or more QoS flows.

The technology disclosed in this disclosure may also be applied to a 4G system. When applied to the 4G system, NR-gNB is replaced with eNB. No changes are made to the interaction between the PCF and the AF. The interaction between the SMF and the PCF is modified as interaction between a PGW and the PCF. QoS flow in 5G is replaced with EPS bearer in 4G. 5QI in 5G is replaced with QCI in 4G. The interaction between the RAN and the AMF/SMF in 5G is replaced with interaction between the RAN and an MME in 4G.

Figure 17:
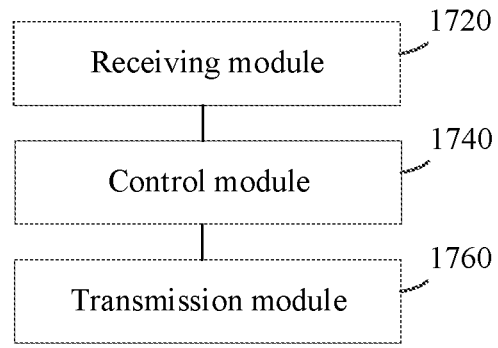
FIG. 17 illustrates an application program control apparatus according to an exemplary embodiment of this disclosure.

FIG. 17 is a block diagram of an application program control apparatus 1700 according to an exemplary embodiment of this disclosure. The apparatus includes:

- a receiving module 1720, configured to receive, by an application entity, a notification message transmitted by a core entity, the notification message being used for indicating that a change in a parameter value of QNC of a non-GBR bearer flow satisfies a reporting condition; and
- a control module 1740, configured to control an application program according to the notification message.

Here, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

In an exemplary implementation of this embodiment of this disclosure, the control module 1740 is configured to control a computing policy of the application program according to the notification message; and/or, the control module 1740 is configured to control a traffic policy of the application program according to the notification message.

In an implementation of this embodiment of this disclosure, the control module 1740 is configured to control, in response to the notification message being used for indicating deterioration of the parameter value of the QNC, the application program to be executed according to a first computing policy, and control, in response to the notification message being used for indicating improvement of the parameter value of the QNC, the application program to be executed according to a second computing policy, computing time of a same computing task under the first computing policy being less than that under the second computing policy.

In an implementation of this embodiment of this disclosure, the control module 1740 is configured to control, in response to the notification message being used for indicating deterioration of the parameter value of the QNC, the application program to perform encoding and decoding in a first encoding and decoding mode, and control, in response to the notification message being used for indicating improvement of the parameter value of the QNC, the application program to perform encoding and decoding in a second encoding and decoding mode, computing time of a same computing task under the first encoding and decoding mode being less than that under the second encoding and decoding mode.

In an implementation of this embodiment of this disclosure, the control module 1740 is configured to control, in response to the notification message being used for indicating deterioration of the parameter value of the QNC, the application program to be executed according to a first traffic policy, and control, in response to the notification message being used for indicating improvement of the parameter value of the QNC, the application program to be executed according to a second traffic policy, traffic of the first traffic policy being less than that of the second traffic policy.

In an implementation of this embodiment of this disclosure, traffic of the application program includes a voice data packet and a video data packet; and the control module 1740 is configured to, in response to the notification message being used for indicating deterioration of the parameter value of the QNC, retain first traffic corresponding to the voice data packet, and reduce second traffic corresponding to the video data packet, and in response to the notification message being used for indicating improvement of the parameter value of the QNC, retain the first traffic corresponding to the voice data packet, and increase the second traffic corresponding to the video data packet.

In an implementation of this embodiment of this disclosure, the notification message is transmitted to the core entity by an access network device entity in response to detecting that the change of a parameter of the QNC of the non-GBR bearer flow satisfies the reporting condition.

In an implementation of this embodiment of this disclosure, the notification message includes:

a changed parameter value of the QNC; or, a quantized value of a changed parameter value of the QNC.

In an implementation of this embodiment of this disclosure, the apparatus further includes:

a transmission module 1760, configured to transmit a control parameter of the QNC to the core entity, the control parameter of the QNC being used for indicating a parameter of the QNC and the reporting condition.

In an implementation of this embodiment of this disclosure, the transmission module 1760 is configured to transmit a policy authorization creation/update message to the core entity, the policy authorization creation/update message containing the control parameter of the QNC.

In an implementation of this embodiment of this disclosure, the method further includes that:

the application entity transmits a changed control parameter of the QNC to the core entity when a reporting frequency of the notification message is greater than or less than a frequency threshold.

In an implementation of this embodiment of this disclosure, the parameter value of the QNC includes at least one of:

a PDB; a PER; and a CBR.

In an implementation of this embodiment of this disclosure, there are at least two parameter values of the QNC;

the at least two parameter values correspond to a same reporting condition; and/or, the at least two types of parameter values correspond to different reporting conditions.

In an implementation of this embodiment of this disclosure, the reporting condition includes at least one of the following:
- a change value of the parameter value of the QNC within first time is greater than a first threshold;
- a change rate of the parameter value of the QNC within second time is greater than a second threshold;
- the change value of the parameter value of the QNC within the first time is greater than the first threshold and continuously retained for a third threshold; and
- the change rate of the parameter value of the QNC within the second time is greater than the second threshold and continuously retained for a fourth threshold,
- the third threshold and the fourth threshold being thresholds for measuring retaining time. the third threshold is a threshold for measuring retaining time of the change value, and the fourth threshold is a threshold for measuring remaining time of the change rate.

In an implementation of this embodiment of this disclosure, the non-GBR bearer flow includes:
- a non-GBR quality of service (QoS) flow; or, a non-GBR evolved packet system (EPS) bearer.

In an implementation of this embodiment of this disclosure, the QNC is defined on an uplink; or, the QNC is defined on a downlink; or, the QNC is defined on an uplink and a downlink.

In an implementation of this embodiment of this disclosure, the non-GBR bearer flow is in one-to-one correspondence to a target service flow, the target service flow being a service flow that enables the QNC and includes the parameter value of the QNC.

Figure 18:
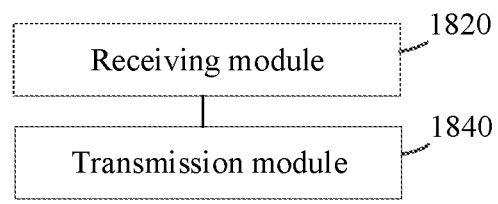
FIG. 18 illustrates an application program control apparatus according to an exemplary embodiment of this disclosure.

FIG. 18 is a block diagram of an application program control apparatus 1800 according to an exemplary embodiment of this disclosure. The apparatus includes:
- a receiving module 1820, configured to receive, by a core entity, a notification message transmitted by an access network device, the notification message being used for indicating that a change in a parameter of quality of service notification control (QNC) of a non-guaranteed bit rate (GBR) flow satisfies a reporting condition; and
- a transmission module 1840, configured to transmit the notification message to an application entity, such that the application entity controls traffic of an application program according to the notification message.

In an implementation of this embodiment of this disclosure, the transmission module 1840 is configured to transmit, by the core entity, an event report to the application entity, the event report containing the notification message.

In an implementation of this embodiment of this disclosure, the notification message includes:
- a changed parameter value of the QNC; or, a quantized value of a changed parameter value of the QNC.

In an implementation of this embodiment of this disclosure, the transmission module 1840 is configured to transmit a QNC profile to the access network device according to a control parameter of the QNC,
the control parameter of the QNC being used for indicating the parameter of the QNC and the reporting condition.

In an implementation of this embodiment of this disclosure, the receiving module 1820 is configured to receive a policy authorization creation/update message transmitted by the application entity, the policy authorization creation/update message containing the control parameter of the QNC.

In an implementation of this embodiment of this disclosure, the receiving module 1820 is configured to obtain subscription data of the QNC, the subscription data of the QNC containing the control parameter of the QNC.

Figure 19:
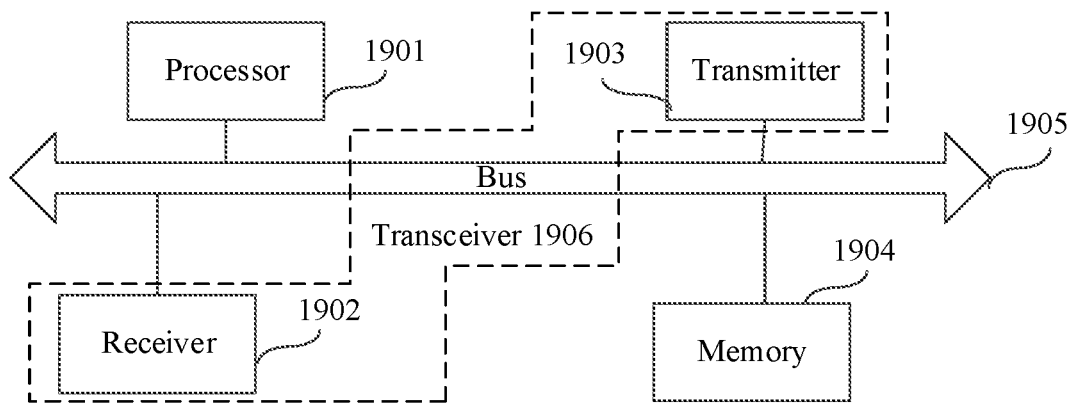
FIG. 19 is a block diagram of a network element device according to an exemplary embodiment of this disclosure.

FIG. 19 is a schematic structural diagram of a network element device 1900 according to an embodiment of this application. For example, the network element device may be configured to perform the application program control method. In an exemplary implementation, the network element device 1900 is an application entity or a core entity. Specifically, the network element device 1900 may include: a processor 1901, a receiver 1902, a transmitter 1903, a memory 1904, and a bus 1905.

The processor 1901 includes one or more processing cores, and the processor 1901 performs various functional applications and information processing by running a software program and module.

The receiver 1902 and the transmitter 1903 may be implemented as a transceiver 1906. The transceiver 1906 may be a communication chip.

The memory 1904 is connected to the processor 1901 through the bus 1905.

The memory 1904 may be configured to store a computer program, and the processor 1901 is configured to execute the computer program to implement each step executed by the application entity, the core network element or the core entity in the foregoing method embodiments.

In addition, the memory 1904 may be implemented by any type of volatile or non-volatile storage device or a combination thereof. The volatile or non-volatile storage device includes, but not limited to: a RAM, a ROM, an erasable programmable ROM (EPROM), an electrically erasable programmable ROM (EEPROM), a flash memory or another solid-state memory technology, a CD-ROM, a digital versatile disc (DVD) or another optical memory, a tape cartridge, a magnetic cassette, a magnetic disk memory, or another magnetic storage device.

This application further provides a computer-readable storage medium, the storage medium storing at least one instruction, at least one program, a code set or an instruction set, and the at least one instruction, the at least one program, the code set or the instruction set being loaded and executed by a processor to implement the application program control method according to the foregoing method embodiments.

In an exemplary implementation, this application further provides a computer program product, the computer program product including computer instructions, the computer instructions being stored in a computer-readable storage medium. A processor of a computer device reads the computer instructions from the computer-readable storage medium and executes the computer instructions to cause the computer device to perform the application program control method according to the foregoing aspects.

What is claimed is:

1. An application program control method, comprising:
receiving, by an application entity, a notification message transmitted by a core entity, the notification message indicating that a quick change in a parameter value of quality of service notification control (QNC) of a non-guaranteed bit rate (GBR) bearer flow satisfies a reporting condition, wherein the notification message comprises a changed parameter value of the QNC or a quantized value of the changed parameter value of the QNC, the changed parameter value of the QNC being a current parameter value of the parameter of the QNC after the quick change in the parameter of the QNC at the time when the reporting condition is triggered; and controlling, by the application entity, an application program according to the quick change in a parameter value of QNC indicated by the notification message.

2. The method according to claim 1, wherein the controlling the application program according to the notification message comprises:
controlling, by the application entity, a computing policy of the application program according to the notification message; or
controlling, by the application entity, a traffic policy of the application program according to the notification message.

3. The method according to claim 2, wherein the controlling the computing policy of the application program according to the notification message comprises:
controlling, in response to the notification message indicating deterioration of the parameter value of the QNC, the application program to be executed according to a first computing policy; and
controlling, in response to the notification message indicating improvement of the parameter value of the QNC, the application program to be executed according to a second computing policy, wherein computing time of a same computing task under the first computing policy is less than that under the second computing policy.

4. The method according to claim 3, wherein the controlling the application program to be executed according to the first computing policy comprises:
controlling, in response to the notification message indicating a deterioration of the parameter value of the QNC, the application program to perform encoding and decoding in a first encoding and decoding mode; and
the controlling the application program to be executed according to the second computing policy comprises:
controlling, in response to the notification message indicating an improvement of the parameter value of the QNC, the application program to perform encoding and decoding in a second encoding and decoding mode, wherein computing time of a same computing task under the first encoding and decoding mode is less than that under the second encoding and decoding mode.

5. The method according to claim 2, wherein the controlling the traffic policy of the application program according to the notification message comprises:
controlling, in response to the notification message indicating deterioration of the parameter value of the QNC, the application program to be executed according to a first traffic policy; and
controlling, in response to the notification message being indicating improvement of the parameter value of the QNC, the application program to be executed according to a second traffic policy, wherein traffic of the first traffic policy is less than that of the second traffic policy.

6. The method according to claim 5, wherein the traffic of the application program comprises a voice data packet and a video data packet, and the controlling the application program to be executed according to the first traffic policy comprises:
in response to the notification message indicating deterioration of the parameter value of the QNC, retaining a first traffic corresponding to the voice data packet, and reducing a second traffic corresponding to the video data packet; and the controlling the application program to be executed according to a second traffic policy comprises:
in response to the notification message indicating improvement of the parameter value of the QNC, retaining the first traffic corresponding to the voice data packet, and increasing the second traffic corresponding to the video data packet.

7. The method according to claim 1, wherein the notification message is transmitted to the core entity by an access network device entity in response to detecting that the change of a parameter of the QNC of a non-GBR bearer flow satisfies the reporting condition.

8. The method according to claim 1, further comprising:
transmitting, by the application entity, a control parameter of the QNC to the core entity, the control parameter of the QNC being for indicating a parameter of the QNC and the reporting condition.

9. The method according to claim 8, wherein the transmitting the control parameter of the QNC to the core entity comprises:
transmitting, by the application entity, a policy authorization creation/update message to the core entity, the policy authorization creation/update message containing the control parameter of the QNC.

10. The method according to claim 1, wherein the reporting condition comprises at least one of:
a change value of the parameter value of the QNC within first time being greater than a first threshold,
a change rate of the parameter value of the QNC within second time being greater than a second threshold,
the change value of the parameter value of the QNC within the first time being greater than the first threshold and continuously retained for a third threshold, or
the change rate of the parameter value of the QNC within the second time being greater than the second threshold and continuously retained for a fourth threshold,
wherein the third threshold and the fourth threshold are thresholds for measuring retaining time.

11. An application program control method, comprising:
receiving, by a core entity, a notification message transmitted by an access network device, the notification message indicating that a quick change in a parameter of quality of service notification control (QNC) of a non-guaranteed bit rate (GBR) flow satisfies a reporting condition, wherein the notification message comprises a changed parameter value of the QNC or a quantized value of the changed parameter value of the QNC, the changed parameter value of the QNC being a current parameter value of the parameter of the QNC after the quick change in the parameter of the QNC at the time when the reporting condition is triggered; and
transmitting, by the core entity, the notification message to an application entity, such that the application entity controls traffic of an application program according to the quick change in a parameter value of QNC indicated by the notification message.

12. The method according to claim 11, wherein the transmitting the notification message to the application entity comprises:
transmitting, by the core entity, an event report to the application entity, the event report containing the notification message.

13. The method according to claim 11, further comprising:
transmitting, by the core entity, a QNC profile to the access network device according to a control parameter of the QNC, the control parameter of the QNC being for indicating the parameter of the QNC and the reporting condition.

14. The method according to claim 13, wherein the core entity comprises a second core entity and a third core entity, and the method further comprises:
   transmitting, by the third core entity, a policy and charging control (PCC) rule to the second core entity, the PCC rule containing the control parameter of the QNC; and
   the transmitting a QNC profile to the access network device according to the control parameter of the QNC comprises:
      transmitting, by the second core entity, the QNC profile to the access network device, the QNC profile containing the control parameter of the QNC.

15. The method according to claim 14, wherein the transmitting the PCC rule to the second core entity comprises:
   transmitting, by the third core entity, a session policy association establishment or initiation-based policy association modification message to the second core entity, the session policy association establishment or initiation-based policy association modification message containing the PCC rule.

16. The method according to claim 14, wherein the transmitting the QNC profile to the access network device comprises:
   transmitting, by the second core entity, a NAS message to the access network device through a first core entity AMF, the NAS message containing the QNC profile.

17. The method according to claim 13, further comprising:
   receiving, by the core entity, the control parameter of the QNC transmitted by the application entity.

18. The method according to claim 17, wherein the core entity comprises a second core entity and a third core entity, and the receiving the control parameter of the QNC transmitted by the application entity comprises:
   receiving, by the third core entity, a policy authorization creation/update message transmitted by the application entity, the policy authorization creation/update message containing the control parameter of the QNC.

19. An application program control apparatus, comprising:
   a memory operable to store computer-readable instructions; and
   a processor circuitry operable to read the computer-readable instructions, the processor circuitry when executing the computer-readable instructions is configured to:
      receive a notification message transmitted from a core entity, the notification message indicating that a quick change in a parameter value of quality of service notification control (QNC) of a non-guaranteed bit rate (GBR) bearer flow satisfies a reporting condition, wherein the notification message comprises a changed parameter value of the QNC or a quantized value of the changed parameter value of the QNC, the changed parameter value of the QNC being a current parameter value of the parameter of the QNC after the quick change in the parameter of the QNC at the time when the reporting condition is triggered; and
      control an application program according to the quick change in a parameter value of QNC indicated by the notification message.

* * * * *